United States Patent [19]
Shackleford et al.

[11] Patent Number: 5,970,487
[45] Date of Patent: Oct. 19, 1999

[54] GENETIC ALGORITHM MACHINE AND ITS PRODUCTION METHOD, AND METHOD FOR EXECUTING A GENETIC ALGORITHM

[75] Inventors: J. Barry Shackleford; Etsuko Okushi; Mitsuhiro Yasuda; Takashi Iwamoto, all of Tokyo, Japan

[73] Assignee: Mitsubishi Denki Kabushiki Kaisha, Tokyo, Japan

[21] Appl. No.: 08/910,103

[22] Filed: Aug. 13, 1997

[30] Foreign Application Priority Data

Nov. 19, 1996 [JP] Japan ................................. 8-308270

[51] Int. Cl.⁶ ........................................... G06F 17/00
[52] U.S. Cl. ................................. 707/6; 707/1; 707/102; 706/13; 706/45
[58] Field of Search ...................... 707/1–206; 706/1–62, 706/900–934

[56] References Cited

U.S. PATENT DOCUMENTS

| | | | |
|---|---|---|---|
| 4,935,877 | 6/1990 | Koza | 706/922 |
| 5,255,345 | 10/1993 | Shaefer | 706/13 |
| 5,390,283 | 2/1995 | Eshelman et al. | 706/62 |
| 5,819,244 | 10/1998 | Smith | 706/10 |
| 5,864,832 | 1/1999 | Meyers | 706/13 |
| 5,867,397 | 2/1999 | Koza et al. | 706/13 |

OTHER PUBLICATIONS

*A Hardware Genetic Algorithm for the Traveling Salesman Problem on Splash 2*, Reconfigurable Logic Laboratory Brigham Young University, Provo Utah, Paul Graham and Brent Nelson, pp. 352–361, Springer, Oxford, 1995.

*Implementing a Genetic Algorithm on a Parallel Custom Computing Machine*, Brown University, Nathan Sitkoff, et al., 1995 IEEE, pp. 180–187.

*Primary Examiner*—Thomas G. Black
*Assistant Examiner*—David Y. Jung
*Attorney, Agent, or Firm*—Burns, Doane, Swecker & Mathis, LLP

[57] ABSTRACT

A multi-purpose non-problem-specific hardware-based framework for the execution of a genetic algorithm (GA) accelerates the execution speed of a GA through the implementation of hardware-based non-problem-specific functions of population memory, first and second chromosome registers, crossover module, mutation operator, and survival comparator. The non-problem-specific aspect of the hardware-based framework turns problem-specific without changing the contents of the framework once a problem-specific fitness function circuit is included for evaluating chromosomal data representing a potential problem solution. The hardware-based framework is thus applicable to a variety of problem-specific aspects of the problem-specific fitness function circuit.

34 Claims, 25 Drawing Sheets

Fig. 18

| CYCLE # | 1 | 2 | 3 | 4 | 5 | 6 | 7 | 8 | 9 | 10 | 11 |
|---|---|---|---|---|---|---|---|---|---|---|---|
| 1ST CHROMOSOME REGISTER 41 | P1 | P2 | P3 | P4 | P5 | P6 | P7 | P8 | ↑ | P9 | P10 |
| 2ND CHROMOSOME REGISTER 42 |  | P1 | P2 | P3 | P4 | P5 | P6 | P7 | ↑ | P8 | P9 |
| CROSSOVER MODULE 50 |  | C1 | C2 | C3 | C4 | C5 | C6 | Ca7 | Cb7 | C8 | C9 |
| MUTATION OPERATOR 60 |  | C'1 | C'2 | C'3 | C'4 | C'5 | C'6 | Ca'7 | Cb'7 | C'8 | C'9 |
| MUTATED CHROMOSOME REGISTER 69 |  |  | C'1 | C'2 | C'3 | C'4 | C'5 | C'6 | C'7 | Cb'7 |  |
| FITNESS FUNCTION CIRCUIT 70 |  |  | 10 | 20 | 30 | 40 | 150 | 60 | 70 | 100 |  |
| FITNESS VALUE 78 OF EVALUATED CHROMOSOME REGISTER 79 |  |  |  | 10 | 20 | 30 | 40 | 150 | 60 | 70 |  |
| CHROMOSOME 77 OF EVALUATED CHROMOSOME REGISTER 79 |  |  |  | C'1 | C'2 | C'3 | C'4 | C'5 | C'6 | C'7 |  |
| SURVIVAL COMPARATOR 80 |  |  |  | 0 | 0 | 0 | 0 | 1 | 0 | 1 |  |
| FITNESS VALUE 94 OF 1ST CHROMOSOME REGISTER 41 | 100 | 99 | 200 | 101 | 98 | 70 | 110 | 120 | ↑ | 50 |  |
| POPULATION MEMORY ADDRESS REGISTER 43 | P1A | P2A | P3A | P4A | P5A | P6A | P7A | P8A | P8A | P9A | P10A |
| LEAST-FIT POINTER REGISTER 45 |  | P1A |  |  | ↑ | ↑ | ↑ | ↑ | P8A | P8A |  |
| LEAST-FIT VALUE REGISTER 49 | 1023 | 100 | 99 | ↑ | ↑ | 98 | 70 | ↑ | 1023 | 120 |  |
| LEAST-FIT POINTER VALID FLIP-FLOP 52 | 0 | 1 | ↑ | ↑ | ↑ | ↑ | ↑ | 1 | 0 | 1 |  |
| AND GATE 53 | 0 | ↑ |  |  |  |  |  | ↑ | 0 | 0 |  |

Fig.20

| MUX | | |
|---|---|---|
| A2 | A1 | SELECTION AT BIT i |
| 0 | 0 | INPUT 0 |
| 0 | 1 | INPUT 1 |
| 1 | 0 | INPUT 2 |
| 1 | 1 | INPUT 3 |

| DECODER | | | MUX | |
|---|---|---|---|---|
| A2 | A1 | OUTPUT | GATE | SELECTION AT BIT i |
| 0 | 0 | 0 | 0 | INPUT 0 |
| 0 | 1 | 1 | 1 | INPUT 1 |
| 1 | 0 | 2 | 2 | INPUT 2 |
| 1 | 1 | 3 | 2 | INPUT 3 |

GENETIC ALGORITHM MACHINE AND ITS PRODUCTION METHOD, AND METHOD FOR EXECUTING A GENETIC ALGORITHM

BACKGROUND OF THE INVENTION

1. Field of the Invention

The present invention relates generally to a general-purpose genetic algorithm machine for executing genetic algorithms and more particularly to a hardware framework for accelerating the execution speed of a genetic algorithm. The present invention is also directed to a method for producing the general-purpose genetic algorithm machine and further to a method for executing a genetic algorithm.

2. Description of the Related Art

FIG. 25 shows a conceptual diagram of a conventional genetic algorithm.

Generic algorithms (hereinafter referred to by the initials, GA) were introduced in 1975 by John Holland as a method for finding an optimum solution to complicated problems. (John H. Holland, "Adaptation in Natural and Artificial Systems," University of Michigan Press, 1975; Second edition: MIT Press, 1992.) For example, the GA is a useful method for finding optimum solutions to the Traveling Salesman Problem described by Grefenstette. In the GA, an emulated chromosomal data structure is initially designed to represent a candidate or trial solution. A plurality of n-bit chromosomes of that data structure are then randomly generated. A plurality of generated chromosomes are registered in groups or populations. A plurality of parent chromosomes are selected from this population of generated chromosomes according to a given algorithm. Each generated chromosome is assigned a unique problem-specific fitness which differs from other chromosomes in the population identifying a solution quality of the chromosome. The problem-specific fitness is expressed by a fitness value. Chromosomes are selected from the population of chromosomes in proportion to their fitness values with more-fit chromosomes having higher probability of being selected. When a pair of parent chromosomes are selected from the population, the parent chromosomes are combined with a probabilistically generated cutpoint. In the case of having no cutpoint generated, either of the parent chromosomes is simply copied to provide a new chromosome as a child chromosome. Thus, a child chromosome is created and outputted. The child chromosome therefore contains portions of each parent or the whole portion of a parent. The child chromosome is then mutated. The mutation is performed with a low probability. The mutation is performed through inversion of a bit in the child chromosome. A mutated child chromosome is then evaluated to be assigned its fitness value. An evaluated child chromosome along with its fitness value is stored as a member of the next generation in the population.

After repeated iteration of this process, the general fitness of chromosomes in the population improves. Thus, a solution to the problem emerges in the population. A solution to the problem is acquired with highly fit chromosomes concentrated in the population.

A major disadvantage of the conventional GA is that the GA is extremely slow in its execution speed when emulated by software on a conventional general-purpose computer.

Some proposals have been addressed for accelerating the processing speed of a GA. Graham, et al. has proposed a hardware implementation of the GA using the Splash 2 machine (Paul Graham and Brent Nelson, "A Hardware Genetic Algorithm for the Traveling Salesman Problem on Splash 2" Field-Programmable Logic and Applications, ed. W. More and W. Luk, pp. 352–361, Springer, Oxford, 1995). A similar attempt of hardware implementation of a GA to accelerate the execution speed of the GA has been proposed by Sitkoff et al. (Nathan Sitkoff, Mike Wazlowski, Aaron Smith, and Harvey Silverman, "Implementing a Genetic Algorithm on a Parallel Custom Computing Machine, " Proceedings of IEEE Workshop on FPGAs for Custom Computing Machines, pp. 180–187, 1995).

These attempts of the hardware implementation of a GA, however, ended in limited success with the speedup factors of roughly 10 times. One reason for their limited gains is copying the original GA proposed by Holland to be implemented on hardware. The original GA into the hardware implementation has thus inefficiencies introduced therein.

Another reason that greater speed gains are not realized is the underlying hardware architecture being used to implement the GA. Graham, et al. employs the Splash 2 machine which is a reconfigurable computer designed to support linear systolic data such as SIMD (single instruction, multiple data) and MIMD (multiple instruction, multiple data).

Sitkoff, et al. employs the Armstrong 3 machine which is a loosely-coupled MIMD multicomputer with reconfigurable computing capabilities. They achieved only limited gains because they implemented GAs in machines whose hardware architectures are not designed originally or particularly to implement the GAs. This can prevent the execution speed of GAs from achieving satisfactory gains.

Thus, a major drawback of conventional machines is the slow execution speed of a GA when emulated by software on conventional general-purpose computers.

A hardware-based implementation of a GA has been addressed for offsetting the drawback but only with a limited success in its execution speed.

SUMMARY OF THE INVENTION

The present invention is directed to solving the problems discussed above. An objective of the present invention is to accelerate the execution speed of a GA in that 100 or 1000 times more of the execution speed of a GA than the conventional speed is achieved for example.

Another objective of the present invention is to provide a multi-purpose hardware framework for executing a GA. The hardware framework is designed to implement the non-problem-specific aspects of the GA for solving a variety of problems.

Still another objective of the present invention is to provide a GA machine based upon the hardware framework which can easily be reconfigurable as a problem-specific machine.

Still another objective of the present invention is to achieve an efficient and effective hardware architecture of a GA machine for accelerating the execution speed of a GA.

Still another objective of the present invention is to provide a GA machine for executing a GA without involving any extra or secondary hardware.

These and other objects are accomplished by the present invention as hereinafter described in further detail.

According to one aspect of the present invention, a genetic algorithm (GA) machine for executing a GA using a chromosome representing a potential problem solution, the GA machine includes a population memory for storing a population of chromosomes, a selector for selecting a chromosome from among the chromosomes in the population as a parent chromosome, a crossover module for inputting a plurality of parent chromosomes and performing a crossover operation on the plurality of parent chromosomes for creating a new chromosome and outputting the new chromosome as a child chromosome, a mutation operator for inputting the child chromosome and mutating the child chromosome and generating a mutated chromosome, a mount for mounting a fitness function circuit for evaluating a fitness of the mutated chromosome and outputting an evaluated value of the fitness of the mutated chromosome, and a survival comparator for determining a survival of the mutated chromosome based upon the evaluated value.

The population memory, selector, crossover module, mutation operator, and survival comparator may be non-problem-specific general-purpose hardware circuits to form a framework of a multi-purpose non-problem-specific GA machine.

The multi-purpose non-problem-specific GA machine may turn into a problem-specific GA machine when a problem-specific fitness function circuit is mounted on the mount.

The population memory may store both the parent and child chromosomes in an area of a single memory space.

The population memory may replace a less-fit chromosome in the population by a more-fit chromosome so that the more-fit chromosome has a longer lifetime in the population memory.

The chromosome may include n bits, wherein the crossover module may include a template generator for generating a template including a pattern indicating a cutpoint, a template shift register having a storage capacity of n bits, for inputting and then shifting the template and outputting bit values corresponding to the respective n bits in the chromosome, and a multiplex operator for performing the crossover operation on the respective n bits in the chromosome, wherein each of the n bits is processed in parallel to another bit, based upon the bit values at corresponding bit positions in the template shift register.

The chromosome may include n bits, wherein the mutation operator includes a mutation module for mutating each bit in an n-bit chromosome singly in parallel to another bit and outputting the mutated chromosome, and a mutated chromosome register for loading each bit in the mutated chromosome in parallel to another bit.

The GA machine may further include an evaluated chromosome register for storing the evaluated value of the fitness and a corresponding chromosome, and a least-fit value register for storing the evaluated value of the fitness of a least-fit parent chromosome among parent chromosomes selected by the selector, wherein the survival comparator compares the evaluated values of the fitness in the evaluated chromosome register and least-fit value register and transfers the evaluated value of the fitness and the corresponding chromosome evaluated to the population memory for the replacement of the less-fit chromosome in the population based upon a compared result.

According to another aspect of the present invention, a method for manufacturing a genetic algorithm (GA) machine for executing a GA using a chromosome representing a potential problem solution, the method comprising the step of producing hardware-based population memory, selector, crossover module, mutation operator, and survival comparator which are designed to implement a GA.

According to still another aspect of the present invention, a method for producing a genetic algorithm (GA) machine for executing a GA using a chromosome representing a potential problem solution, the method may include the steps of producing at least one of population memory, selector, crossover module, mutation operator, and survival comparator formed as a multi-purpose non-problem-specific framework, and producing a fitness function circuit for evaluating a problem-specific fitness of the chromosome, and mounting the fitness function circuit on the multi-purpose non-problem-specific framework so that the GA machine turns problem-specific.

According to yet another aspect of the present invention, a method for executing a genetic algorithm (GA) using a chromosome representing a potential problem solution in a GA machine provided with a population memory for storing a population of chromosomes along with corresponding values of a fitness, the method may include the step of replacing a less-fit chromosome among chromosomes in the population with a more-fit child chromosome created through an execution of the GA so that a more-fit chromosome has a longer lifetime in the population memory.

The method for executing a GA may further include the steps of storing an address in the population memory of a least-fit chromosome among chromosomes selected after a replacement of the less-fit chromosome in the population, and replacing a chromosome at the address in the population memory with a child chromosome.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 18 shows a chart illustrating an overall operation of the GA machine of FIG. 17;

FIG. 20 shows a table illustrating an operation of a multiplexer of FIG. 19 used for the crossover of four chromosomes according to the present invention;

FIG. 22 shows a table illustrating the operations of a decoder and a multiplexer of FIG. 21 used for the crossover of three chromosomes according to the present invention;

DETAILED DESCRIPTION OF THE PREFERRED EMBODIMENTS

Figure 1:
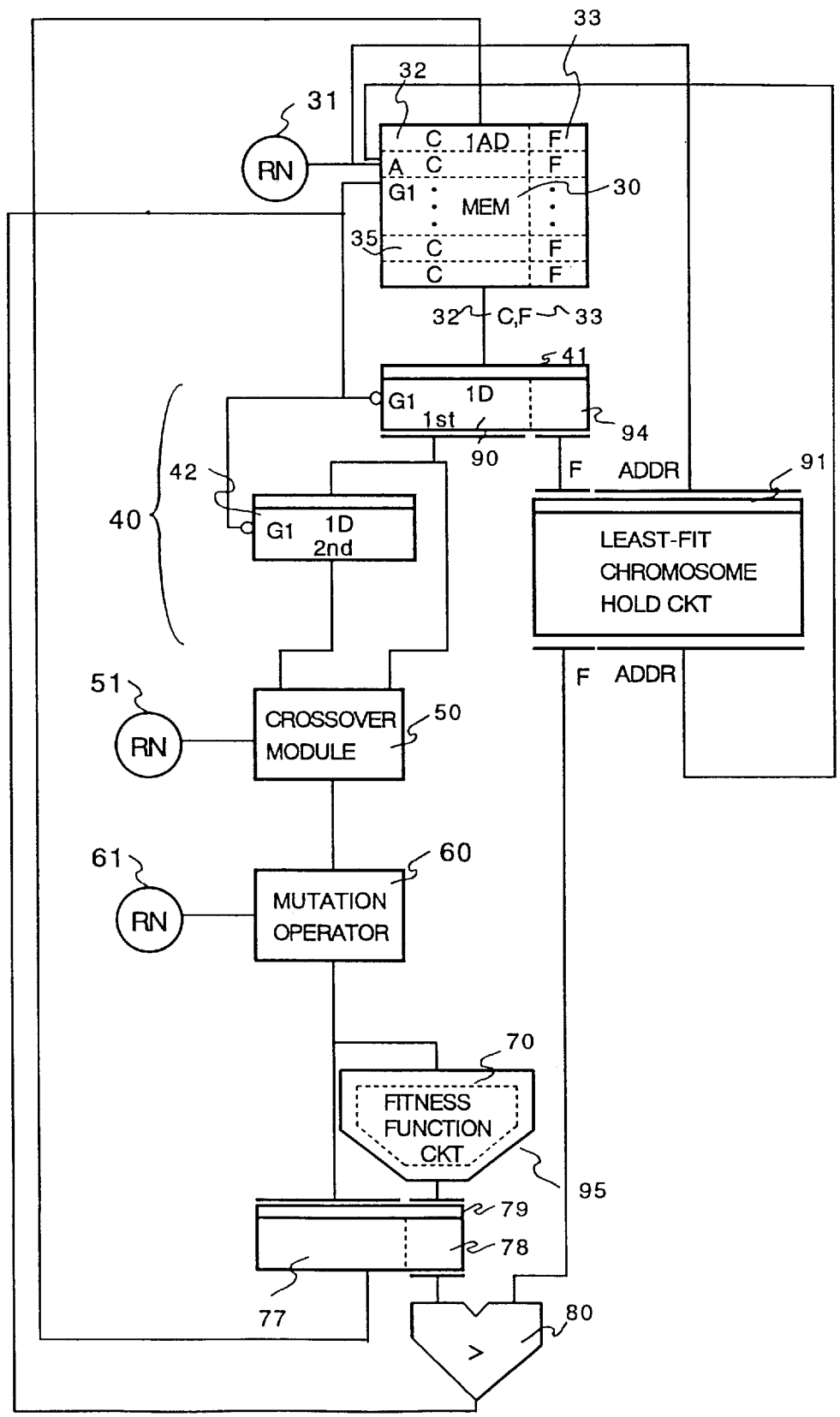
FIG. 1 shows a conceptual diagram of a GA machine according to the present invention.

Reference will now be made in detail to the present preferred embodiments of the invention, examples of which are illustrated in the accompanying drawings, wherein like reference numerals indicate like elements through out the several views.

Embodiment 1.

FIG. 1 shows a block diagram of a genetic algorithm (GA) machine according to the present invention. A detailed description of the GA machine will be described later.

The GA machine of FIG. 1 shows its conceptual view illustrating a framework of a GA machine. The term framework here means a non-problem-specific hardware for providing a processing environment for various problems. The hardware here defines any circuit including wired logic circuits and circuits composed of ROM (Read Only Memory), PROM (Programmable ROM), and gate arrays.

The non-problem-specific framework applicable to various problems can be implemented in either VLSI (very large scale integrated) technology or FPGA (field-programmable gate array) technology. These VLSI and FPGA can be, for example, IC (Integrated Circuit) based synthetic devices. Alteration of the bit-width of a memory or register to be used for the framework is possible. It may be desirable to prepare several memories and registers in different bit-width sizes in frequent use as the framework. Again as mentioned earlier, this framework can include any circuits composed of ROM, PROM, and gate arrays and wired logic circuits.

The GA framework of FIG. 1 is now described in detail illustrating each of the composing elements of the GA machine of FIG. 1 singly in accordance with an operational sequence of this embodiment.

A population memory 30 is composed of RAM (random-access memory) for example. The function of the population memory 30 is to hold a population of n-bit chromosomes C(32) along with their respective fitness values F(33). Each chromosome is evaluated by a fitness function circuit 70, whose operation will be described later, and assigned an evaluated value of a problem-specific fitness. To start the GA machine, the population memory 30 is filled with random n-bit patterns of 1s and 0s as chromosomes together with the corresponding m-bit patterns of problem-specific fitness values. An initialization of the population memory 30 will be discussed later.

Two chromosomes are selected from among the chromosomes in the population memory 30 at random and then loaded into first and second chromosome registers 41, 42 (one for each parent) as a pair of parent chromosomes 90. A least-fit chromosome hold circuit 91 detects a least-fit value of all fitness values 94 of the parent chromosomes 90 loaded in the first chromosome register 41 each time a new parent chromosome is selected and loaded into the first chromosome register 41. The least-fit chromosome hold circuit 91 holds the detected least-fit value of a least-fit parent chromosome along with the address of the least-fit parent chromosome in the population memory 30. The least-fit value and address are updated upon a detection of the fitness value 94 which is less than the current least-fit value.

The first and second chromosome registers 41, 42 are connected in parallel to each other to a crossover module 50. The crossover module 50 cuts the two parent chromosomes at the same random point and produces a child chromosome composed of the left-cut portion of a first parent chromosome and the right-cut portion of a second parent chromosome. The resultant child chromosome is then subjected to a low-probability (1 per-cent per bit for example) mutation by the mutation operation 60. With the mutation being probabilistic, all bits have the same independent chance of mutation, so multiple bit changes in an n-bit chromosome are possible. A chromosome is mutated through inversion of 0s inverted to 1s, and vice versa. A mutated child chromosome is then evaluated by the fitness function circuit 70 which is mounted on a fitness function circuit mount 95. The fitness function circuit 70 is not a member of the composing elements of the GA machine of FIG. 1. The fitness function circuit 70 is a removable unit from the GA machine or framework. The fitness function circuit 70 is a hardware circuit for problem-specific programming the framework of FIG. 1. The fitness function circuit 70 can be implemented in either VLSI technology or FPGA technology for example. The fitness function circuit mount 95 can be implemented with a socket carrying a VLSI or FPGA circuit for example. Alternatively, the fitness function circuit mount 95 can be a fixer on which the fitness function circuit 70 may be soldered for example. The fitness function circuit mount 95 can alternatively be any of connector, carrier, support, etc. The fitness function circuit 70 computes the fitness of a child chromosome and outputs its fitness value. An evaluated chromosome register 79 stores the child chromosome outputted from a mutation operator 60 and the corresponding fitness value outputted from the fitness function circuit 70. A survival comparator 80 receives the fitness value of the child chromosome and the fitness value of the least-fit value held in the least-fit chromosome hold circuit 91 for comparison. If the child chromosome is more fit than the least-fit parent chromosome having the least-fit value registered in the least-fit chromosome hold circuit 91, the child chromosome then replaces a chromosome in the population memory 30 corresponding to the least-fit parent chromosome. The replaced chromosome by the child chromosome is called a less-fit member 35 of chromosome 32 in the population memory 30 whose fitness is relatively low to those of other chromosomes 32.

By repeating this process the overall fitness of the population is increased, thus increasing the solution quality of the problem being solved by the GA.

Figure 2:
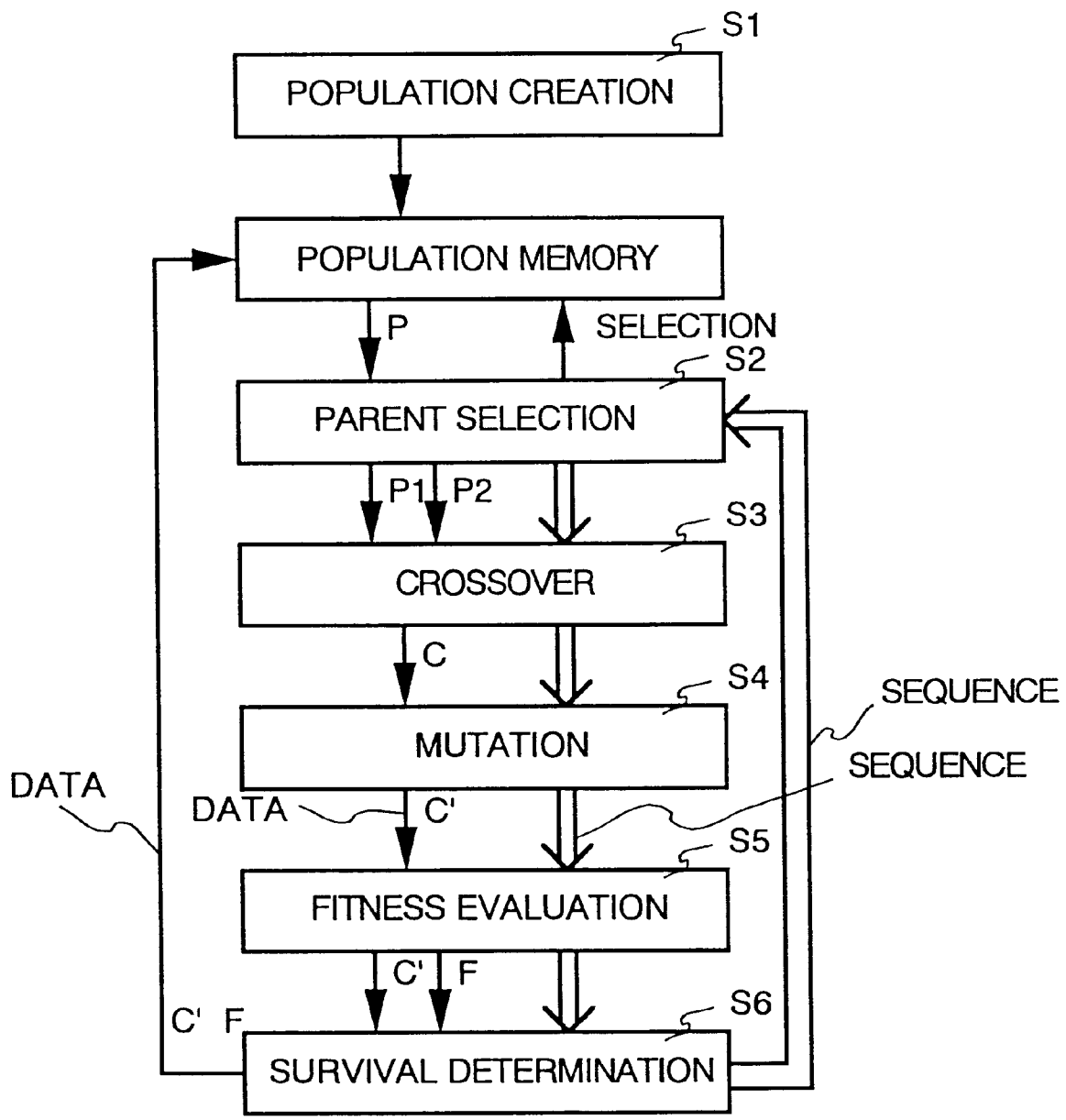
FIG. 2 shows a flowchart illustrating a flow of the GA according to the present invention.

The framework of FIG. 1 is characterized by both fast processing speed and efficient utilization of hardware, and further, the GA proposed by Holland is adapted in a revised form for hardware implementation other than in the original form. The method of revising the original GA employed here will be discussed hereinafter. An operation of a hardware-based GA machine of FIG. 1 is now described with reference to FIG. 2. FIG. 2 shows a flowchart of a GA according to the present invention with parent chromosomes P1, P2, a child chromosome C, a mutated child chromosome C', and a fitness value F.

Population Creation Step S1

Create a population of randomly generated chromosomes, evaluate their respective fitness values and store them as the chromosomes 32 and their fitness values 33 in the population memory 30.

Parent Selection Step S2

Randomly select a parent chromosome from the population memory 30 and load the first parent chromosome to the first chromosome register 41. When a parent chromosome is newly selected, the parent chromosome 90 that was previously in the first chromosome register 41 is transferred to the second chromosome register 42. The first chromosome register 41 then receives the newly selected parent chromosome. Upon each new parent-chromosome selection and loading into the register 41, the least-fit chromosome hold circuit 91 examines the fitness value 94 of a newly selected parent chromosome 90 to detect a fitness value which is less than the currently held least-fit value. The least-fit chromosome hold circuit 91 holds the least-fit value of all the fitness values 94 of parent chromosomes 90 loaded into the first chromosome register 41 as the less-fit member 35 of chromosomes 32 in the population memory in the end. Upon each detection of a fitness value less than a current least-fit value the current least-fit value is registered in a MIN HOLD register or least-fit value register 49 (shown in FIG. 17), whose operation will be discussed later, in the least-fit chromosome hold circuit 91. The least-fit chromosome hold circuit 91 has a least-fit pointer 44, whose operation will be discussed hereinafter. The least-fit pointer 44 is a pointer to the location or address in the population memory 30 of a chromosome corresponding to the least-fit parent chromosome having the least-fit value. If the fitness value of a new parent chromosome read out to the first chromosome register 41 is less than the least-fit value of the current least-fit parent chromosome, then the new parent chromosome 90 in the first chromosome register 41 becomes the new least-fit parent chromosome and its address in the population memory 30 is then stored as a pointer (not shown).

Crossover Step S3

Create a child chromosome from the two parent chromosomes residing in the first and second chromosome register 41, 42, through a crossover process in the crossover module 50. The simplest form of crossover process is a single-point crossover whereby the first and second chromosome registers 41, 42 are divided, each at the same bit location, and the data to the left of that location in the first chromosome register 41 is used to form the left part of the child chromosome and the data inclusive of the bit and to the right in the second chromosome register 42 is used to form the right part of the child chromosome.

Mutation Step S4

Each bit in the child chromosome is exposed to the possibility of mutation. For example, the probability of mutation for each bit is on the order of 1 per-cent.

Fitness Evaluation Step S5

Evaluate the child chromosome in the fitness function circuit 70. The fitness function circuit 70 is a reconfigurable circuit which evaluates the problem-specific fitness of a child chromosome.

Survival Determination Step S6

Determine the survival of the child chromosome based upon the fitness value of the child chromosome outputted from the fitness function circuit 70. The fitness value of the child chromosome is compared with the least-fit value of the least-fit parent chromosome stored in the least-fit chromosome hold circuit 91. If the child chromosome is more fit, then the child chromosome replaces the less-fit member 35 of chromosomes 32 in the population memory 30 corresponding to the least-fit parent chromosome. If the child chromosome is less fit, then the child chromosome is simply discarded.

The repetitions of this process including S2 to S6 will improve the quality of candidate solutions toward an optimum solution.

Now differences are considered between the inventive hardware-based GA machine of this embodiment discussed with reference to FIGS. 1 and 2 and the conventional hardware-based GA.

(1) Population Memory

In the conventional art, the population is divided into current population and new population. The current population contains parent chromosomes, and the new population is the repository of the next generation of child chromosomes created from the parent chromosomes in the current population. The child chromosomes are either simply copies of a parent chromosome or mutated. Thus the conventional chromosomal generation control including current and new populations requires separate memories for sorting two generations. This is disadvantageous to a hardware implementation in that the size of the memory used to implement the population memory must be doubled. Whereas this embodiment uses a single population memory in which the chromosomes and their offspring are stored coexisting.

(2) Selection

In the conventional art, the parent chromosomes are selected with a probability proportional to their fitness, with more-fit chromosomes being selected more often. This is disadvantageous to a hardware implementation in that a proportional selection of chromosomes to their fitness causes the hardware to be more complicated. With a software implementation, a probabilistic selection of chromosomes in proportion to their fitness requires extra time. The intent of probabilistic selection is to allow more-fit chromosomes to have a greater influence of subsequent generations. This embodiment accomplishes the same intent by using simple random selection, without regard to fitness. This embodiment's replacing approach of least-fit chromosomes by more-fit child chromosomes in a single population memory allows the longer lifetime of the more-fit chromosome. More-fit chromosomes can survive longer in the population memory 30. This accounts for higher probability of more-fit chromosomes selected more often from the population memory 30 by using simple random selection. Thus accomplished the intent of the more-fit chromosomes having a greater influence of subsequent generations.

(3) Probability of Crossover

In the conventional art, crossover is performed probabilistically, that is, crossover may not be performed in some cases. When crossover is not performed, either of the parent chromosomes is simply copied to create a child chromosome. The child chromosome of parent's copy is then mutated and stored as the next generation. In contrast, this embodiment of the present invention performs crossover on all chromosomes selected from the population memory. Since all chromosomes remain in the population memory 30 a period of time proportional to their fitness, there is no need to perform the conventional copy operation to create a child chromosome of parent's copy for creating a member of a new population. This, in effect, is an overhead operation that reduces the processing throughput of the GA.

(4) Survival

In the conventional art, all offspring survive to be transferred to the new population. In this embodiment, only offspring or child chromosomes that are more-fit than the current least-fit chromosome 35 survive to be transferred into the population memory 30. The least-fit chromosome 35 is discarded in the population memory 30.

The different aspects (1) through (4) of the GA machine of the present invention from the conventional hardware-based GA machine discussed above are equally applicable to those from the original GA proposed by Holland. The GA machine of this embodiment is clearly different from the original GA at least in the aspects (1) though (4). The GA machine of the present invention accelerates the executing speed of a GA because of these differences. These differences improves the inventive GA machine considerably in its easier and simpler hardware architecture.

The GA machine of this embodiment is now described further through a detailed description of the respective composing elements of the machine with reference to FIGS. 3 through 16. FIG. 17 is a supplementary diagram of the GA machine of FIG. 1 in detail incorporating all the respective composing elements described singly. The respective composing elements of the GA machine operate in synchronization with a machine cycle (not shown) by a clock supplied to the respective elements from a clock generator (not shown) via signal lines (not shown).

1. Population Memory 30

Figure 3:
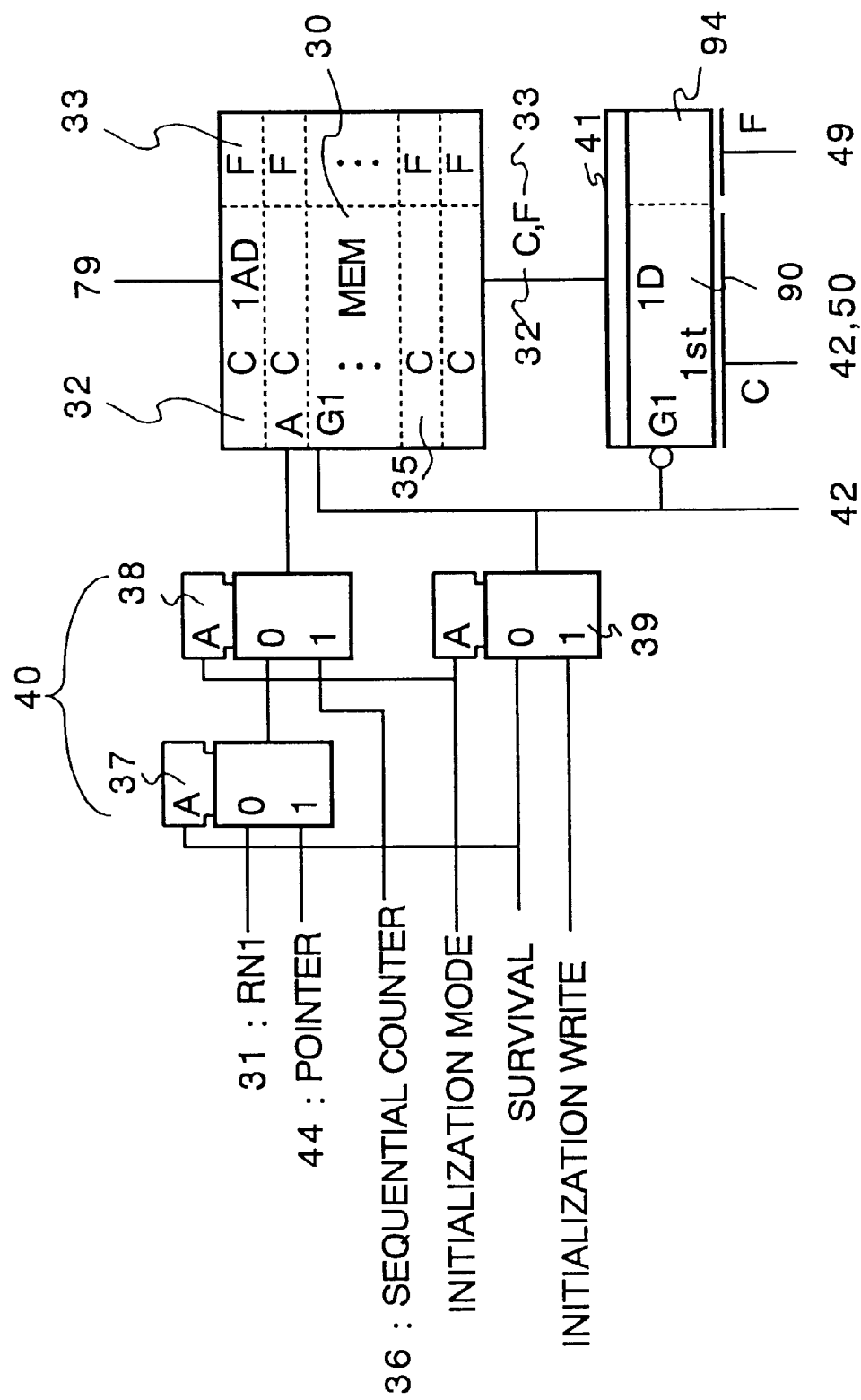
FIG. 3 shows a population memory 30 of the GA machine of FIG. 1 and its neighboring circuits.

FIG. 3 shows the population memory 30 and its neighboring circuits of the GA machine of FIG. 17.

The population memory 30 includes random access memory (RAM), whose function is to hold the population of chromosomes 32 (designated by C in FIGS. 3 through 17). Each chromosome 32 is a potential problem solution or candidate solution composed of n bits ($1 \leq n$) in a bit string, each bit representing a genetic meaning which can only be identified by the fitness function circuit 70. The hardware-based composing elements of the GA machine of FIG. 1 including the population memory 30 engage in storing or processing chromosomes without regard to the meaning of each bit. The population memory 30 stores the chromosomes 32 along with their respective fitness values 33 (each designated by F in the figures) each designating the quality of a potential problem solution of the chromosome 32. In an optimization problem there are typically many solutions of varying quality. If the fitness value 33 of the chromosome 32 is assigned high, then the quality of the potential problem solution represented by the chromosome 32 is considered high next or near to an optimum solution.

The population memory 30 is now described further in terms of its size.

When the bit-width of one word of the population memory 30, i.e. a bit-width for a RAM access, is equal to the sum (n+m bits) of the bit-width or number of composing bits (n bits) of the chromosome 32 and that (m bits) of the fitness value 33, the advantage of high-performance of data access in speed to the population memory 30 is achieved. The chromosome 32 along with its fitness value 33 is read out to the first chromosome register 41 on a single machine cycle from the population memory 30, and similarly a child chromosome along with its fitness value is written into the population memory 30 on a single machine cycle. In contrast with respect to the cost, a longer bit-width requires many I/O (input/output) pins and lines for RAM circuits or packages as parts of the population memory 30. With n+m bits for a word bit-width, for example, n+m number of I/O pins are required for the RAM package.

The chromosome 32 and its fitness value 33 can alternatively be stored separately in the population memory 30. The chromosome 32 can be divided into r segments thus reducing the RAM bit-width. This requires, however, r words/times of RAM access for a single reading/writing operation of the chromosome 32 along with its fitness value 33 because r machine cycles is required for each reading/writing of a chromosome from/to the population memory 30. This approach has the advantage of reduced I/O pins and lines, but at the cost of reduced performance in the execution speed.

The population memory 30 is now described further in terms of addressing.

There are three address sources of sequential counter 36, random number generator 31, and least-fit chromosome pointer 44 in order to supply addresses to the population memory 30 in three respective modes of the GA machine of FIG. 17: initialization, selection, and survival modes.

(1) Sequential counter 36

The sequential counter 36 is an address source in the initialization mode for generating an initial random bits in a string of the chromosome 32 to be stored in the population memory 30. The sequential counter 36 generates a sequential address, based upon which each random-bit chromosome is written sequentially in the population memory 30.

(2) Random number generator 31 (RN1)

The random number generator 31 is an address source in the selection mode for selecting the chromosome 32 as the parent chromosome 90 from the population memory 30. The random number generator 31 generates a random number as an address, based upon which the chromosome 32 is selected randomly from the population memory 30. The random number generator 31 is part of a selector 40.

(3) Least-fit chromosome pointer 44

The least-fit chromosome pointer 44 is an address source in the survival mode for writing a child chromosome into the population memory 30. The least-fit chromosome pointer 44 is held in a least-fit pointer register 45, whose operation will be discussed hereinafter, provided in the least-fit chromosome hold circuit 91. The least-fit chromosome pointer 44 indicates the address of the population memory 30 of the least-fit parent chromosome corresponding to the less-fit member 35 of the chromosomes 32 for which a new child chromosome is replaced.

Figure 4:
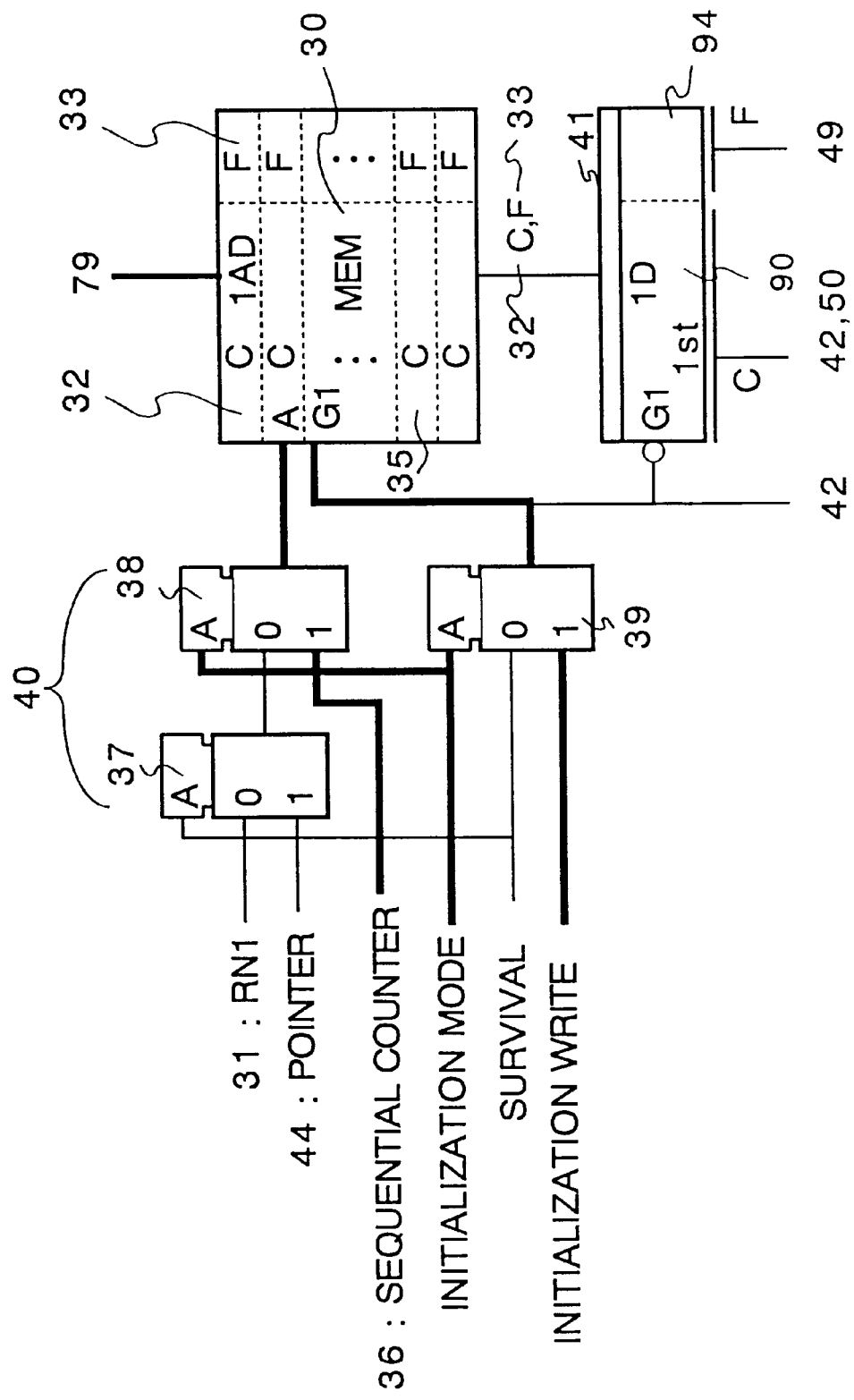
FIG. 4 shows the population memory 30 and its neighboring circuits of FIG. 3, illustrating that a sequential counter 36 provides an address to the population memory 30 in an initialization mode according to the present invention.

FIG. 4 shows an address supply operation from the sequential counter 36 to the population memory 30 in the initialization mode. Bold lines in the figure designate effective signals. When the mode of the GA machine changes to the initialization mode, an initialization mode signal turns ON, which turns a second multiplexer 38 ON to select an address input from the sequential counter 36. The address from the sequential counter 36 is then inputted to the population memory 30 at an address A. The initialization mode signal also opens a gate G1 of the population memory 30 via a third multiplexer 39 selecting an input of an initialization write signal, whereby the population memory 30 turns write-enable. Meanwhile data to be written into the population memory 30 are transferred to the population memory 30 at an input 1AD from the evaluated chromosome register 79 whose operation will be discussed in detail hereinafter.

Figure 5:
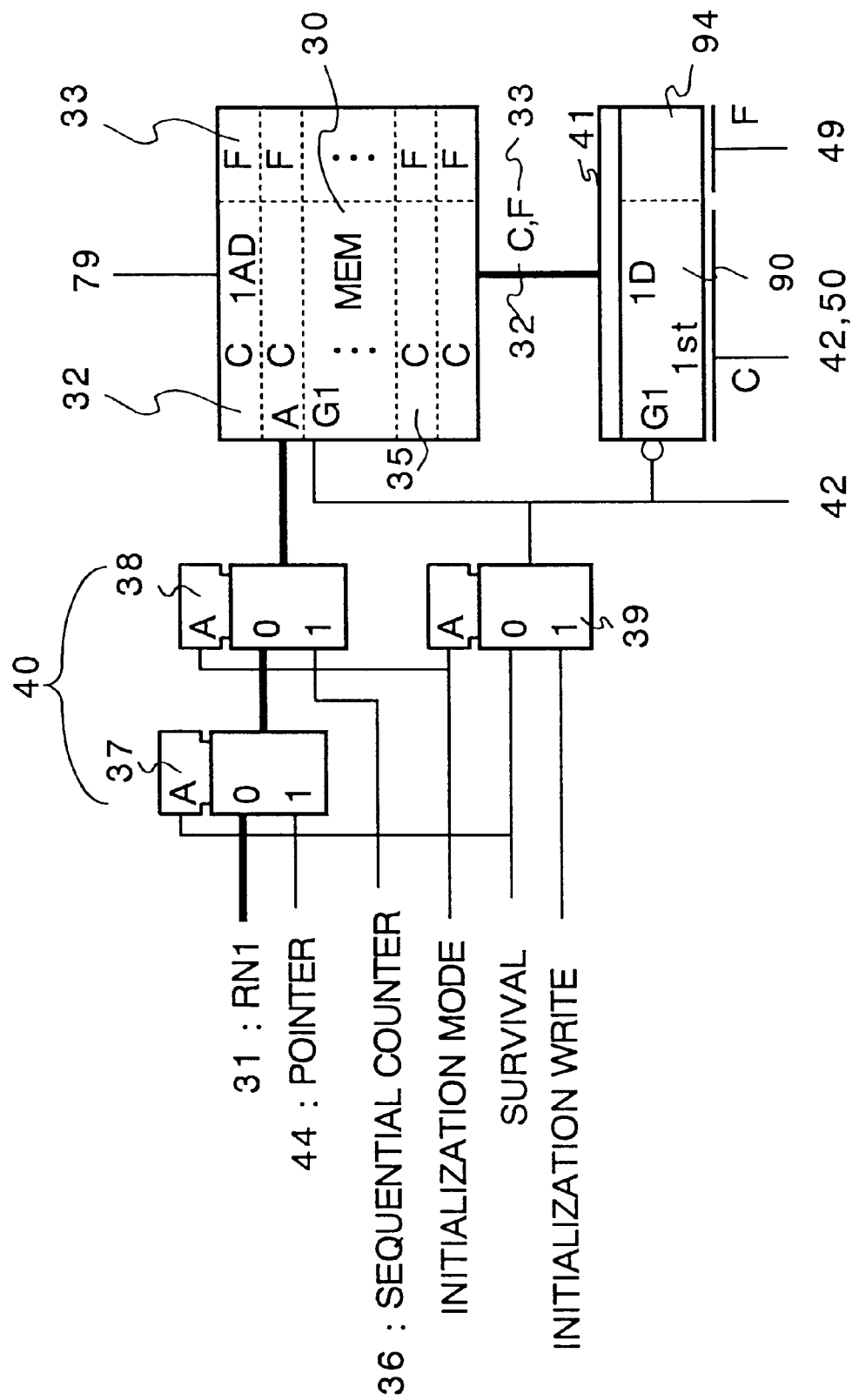
FIG. 5 shows the population memory 30 and its neighboring circuits of FIG. 3, illustrating that a random number generator 31 provides an address to the population memory 30 in a selection mode according to the present invention.

FIG. 5 shows an address supply operation from the random number generator 31 (RN1) to the population memory 30 in the selection mode involving a first multiplexer 37 and the second multiplexer 38 in the selector 40. Bold lines in the figure designate effective signals.

During the selection mode with no mode signal inputs of survival and initialization, a random number generated by the random number generator 31 is passed through the first multiplexer 37 and then second multiplexer 38 to be supplied to the population memory 30 at the address A. The random number generated by the random number generator 31 specifies an address among a limited number of addresses available in a certain memory area of the population memory 30. The population memory 30 selects one of the chromosomes 32 at the supplied address of the random number and outputs the chromosome 32 along with its fitness value 33 to the first chromosome register 41.

Figure 6:
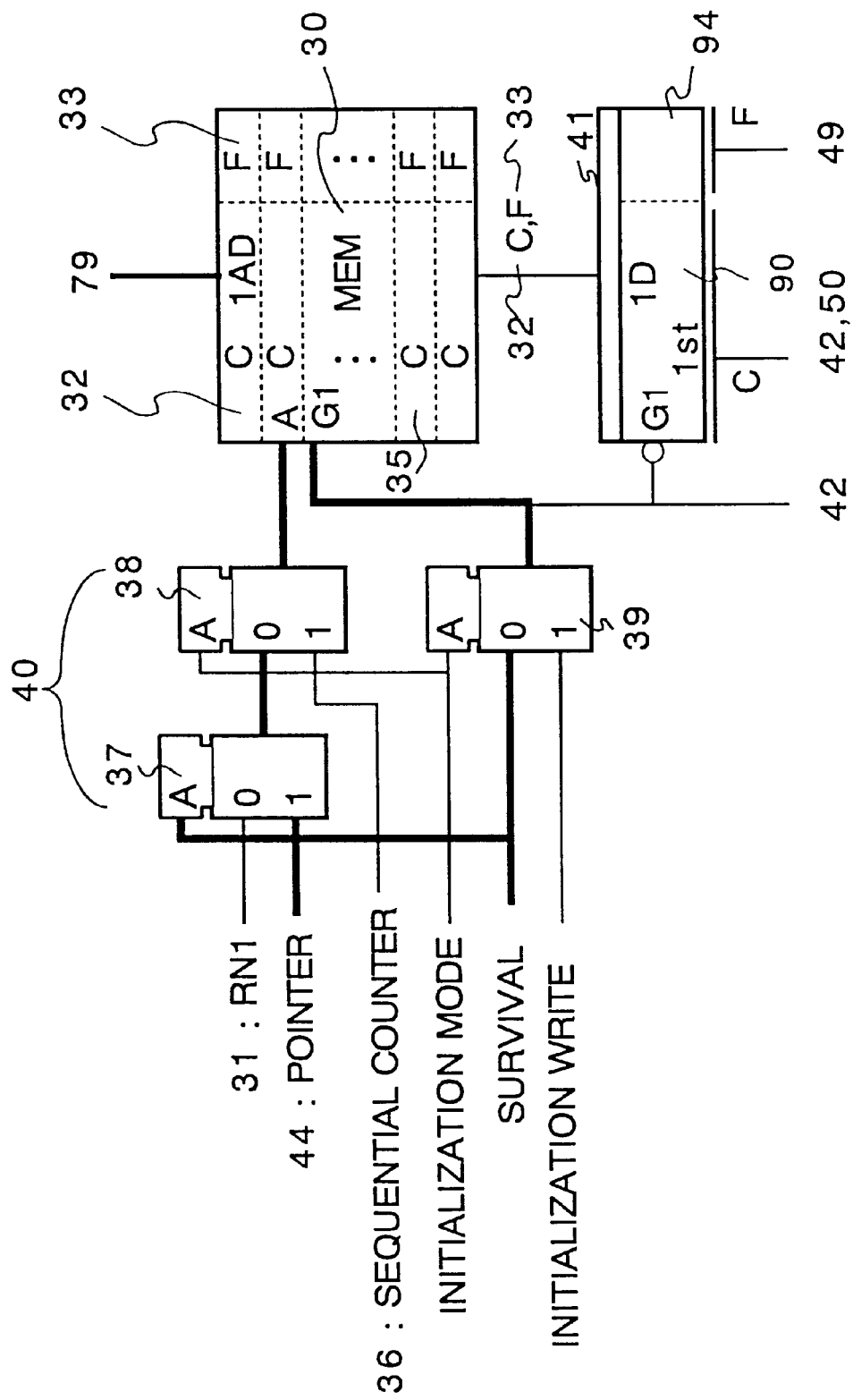
FIG. 6 shows the population memory 30 and its neighboring circuits of FIG. 3, illustrating that a least-fit pointer 44 provides an address to the population memory 30 in a survival mode according to the present invention.

FIG. 6 shows an address supply operation from the least-fit pointer 44 to the population memory 30 in the survival mode. Bold lines in the figure designate effective signals. When the mode changes from selection to survival, the survival signal turns ON whereby the first multiplexer 37 selects an address input from the least-fit pointer 44. Thus, the address of the less-fit member 35 of chromosomes 32 indicated by the least-fit pointer 44 is passed through the first and second multiplexers 37, 38 to be supplied to the population memory 30 at the address A. The survival signal also opens the gate G1 of the population memory 30 via the third multiplexer 39, whereby the population memory 30 turns write-enable. Meanwhile, the population memory 30 receives a new child chromosome to be written as replacement at the input 1AD transferred from the evaluated chromosome register 79.

2. Selector 40

The selector 40 selects chromosomes at random from among chromosomes 32 in the population memory 30. In the conventional art, chromosomes are selected with a probability proportional to their fitness. Since the random selection method employed in this embodiment does not require any special calculation based upon the individual chromosome's fitness in relation to the aggregate population fitness, the implementation is easier and cheaper and the processing speed is faster than in the prior art.

3. Least-fit chromosome hold circuit 91

Figure 7:
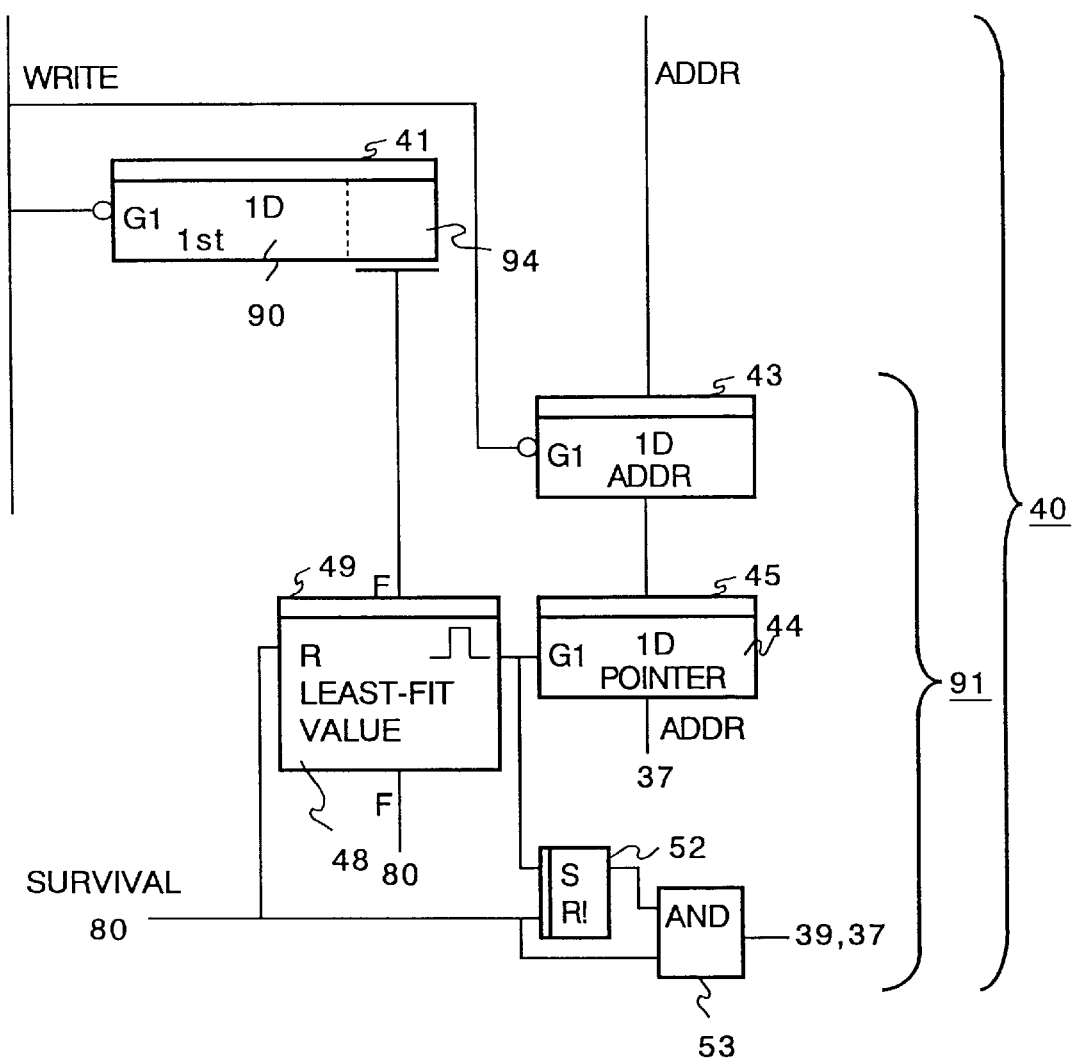
FIG. 7 shows a block diagram of a least-fit chromosome hold register 91 of a selector 40 of FIG. 1 in detail.

FIG. 7 shows a block diagram of the least-fit chromosome hold circuit 91 as part of the selector 40 in detail.

The least-fit chromosome pointer 91 is a pointer indicating which chromosome among chromosomes 32 in the population memory 30 is to be replaced by a newly created child chromosome whose fitness is better than the fitness of the least-fit parent chromosome. The least-fit pointer 44 held in the least-fit pointer register 45 holds the address of the least-fit parent chromosome whose fitness is the least of all the fitnesses 94 of the parent chromosomes 90 read out to the first chromosome register 41. Therefore the least-fit pointer 44 holds the address of the less-fit member 35 of chromosomes 32 but that of the least-fit chromosome in the population memory 30. Suppose that the least-fit pointer 44 holds the address of the least-fit chromosome in the population memory 30 and the least-fit chromosome is replaced by a new child chromosome, then an extra circuit or sorting/searching operation for finding a next least-fit chromosome is required. Since a chromosome replacement in the population memory 30 is performed between a newly created child chromosome and the less-fit member 35 of chromosomes 32 and not the least-fit chromosome of the chromosome 32 in this embodiment, no extra circuit or operation is required for detecting a second least-fit chromosome in the population which allows the selector 40 simplified in architecture.

The fitness value 94 of the least-fit parent chromosome 90 is loaded in the least-fit value register 49 as a least-fit value 48. On every parent selection cycle, the least-fit value register 49 compares the fitness value 94 of the parent chromosome 90 loaded in the first chromosome register 41 with the current least-fit value 48 and automatically retains any value at its input that is less than the value it is presently storing. In synchronization with the least-fit value register 49 updating the least-fit value 48, the least-fit pointer register 45 updates the least-fit pointer 44. A population memory address register 43 holds the address of the parent chromosome 90 read out to the first chromosome register 41 on each parent selection cycle. When the least-fit value register 49 updates the least-fit value 48, the address loaded in the population memory address register 43 is automatically transferred to the least-fit pointer register 45 and a least-fit pointer-valid flip-flop 52 is set. The setting of the least-fit pointer-valid flip-flop 52 indicates that the least-fit value 48 retained in the least-fit value register 49 and the least-fit pointer 44 held in the least-fit pointer register 45 are validated. The least-fit pointer-valid flip-flop 52 is reset upon a write of a new child chromosome into the population memory 30 in the survival mode. With signs S and R! in the least-fit pointer-valid flip-flop 52 of FIG. 7 indicating set and reset signals, respectively, the mark ! of R! indicates that the reset signal is prioritized over the set signal in the event that the set and reset signals are validated both at the same time. The least-fit value 48 of the least-fit value register 49 is set to a maximum value upon the initialization of the selection mode and soon after a write operation of a child chromosome to the population memory 30 in the survival mode. With the least-fit value register 49 having the loading capacity of 10 bits, for example, a value 1023, the maximum value of 10, is set. If a newly selected parent chromosome 90 from the population memory 30 into the first chromosome register 41 has the fitness value 94 less than the current least-fit value 48, the least-fit value register 49 updates the current least-fit value 48 by the fitness value 94 of the new parent chromosome 90 as the least-fit parent chromosome. At the same time, the address of the least-fit parent chromosome is set in the least-fit pointer register 45 and the pointer-valid flip-flop 52 is set.

4. First and Second Chromosome Registers 41, 42

Figure 8:
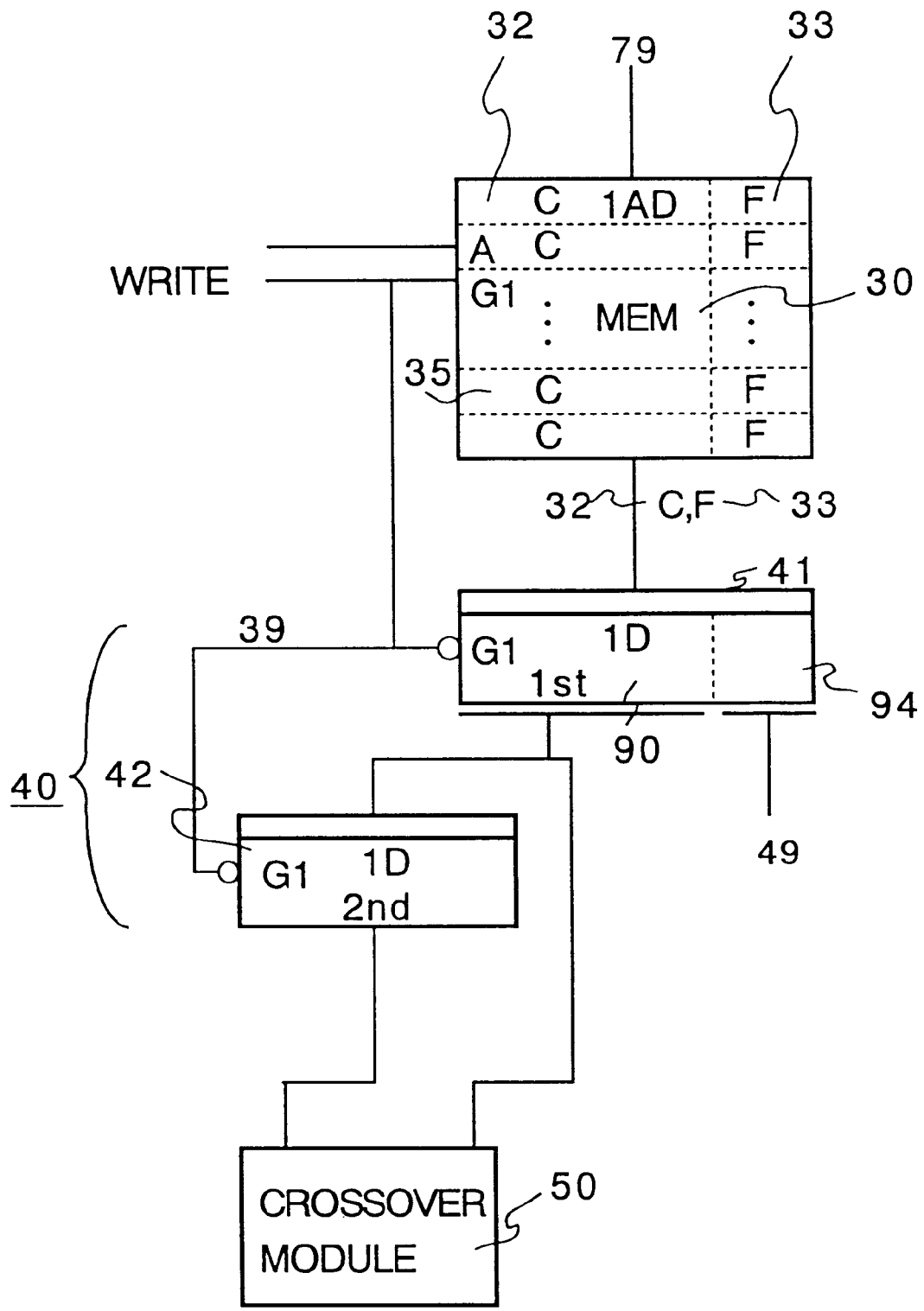
FIG. 8 shows a block diagram of first and second chromosome registers of the selector 40 and neighboring circuits of FIG. 1.

FIG. 8 shows a block diagram of the first and second chromosome registers 41, 42 both as parts of the selector 40.

The selector 40 includes the first and second parent chromosome registers 41, 42 for temporarily storing a selected parent chromosome from the population memory 30. The first and second chromosome registers 41, 42 are cascaded in series for passing a parent chromosome from the first chromosome register 41 to the second chromosome register 42 so that a parent chromosome outputted from the population memory 30 is transferred first to the first chromosome register 41 and then to the second chromosome register 42. The first and second chromosome registers 41, 42 output the respective received parent chromosomes in parallel to each other concurrently to the crossover module 50 so that the crossover module 50 receives two parent chromosomes at the same time from the first and second chromosome registers 41, 42. The input of the first chromosome register 41 is connected to the output of the population memory 30 for inputting the chromosome 32 and its fitness value 33. The input of the second chromosome register 42 is connected to a chromosome output of the first chromosome register 41 for inputting the chromosome 32 only. In this manner, once a chromosome has been selected, the chromosome will serve first as the first parent chromosome on a certain cycle and then as the second parent chromosome on the subsequent cycle. This allows the crossover module 50 to perform a crossover operation on every cycle so that a crossover operation is performed on every selection cycle having a parent chromosome selected from the population memory 30. Upon a write of a new child chromosome into the population memory 30 in the survival mode, all the parent selection related operation is suspended in the selector 40. The loading of parent chromosomes in the first and second chromosome registers 41, 42 is suspended. With no loading of parent chromosomes the contents of the first and second chromosome registers 41, 42 remain unchanged from the previous stage. In the survival mode, however, the crossover module 50 performs a crossover operation by using the same parent chromosomes as those used in the previous crossover operation. With the same parent chromosomes, a child chromosome can be created different from that created in the previous crossover operation in the crossover module 50. On every crossover cycle a different cutpoint is used for crossover and a different bit position is used for mutation so that the probability of creating identical child chromosomes is lessened.

5. Crossover module 50

Figure 9:
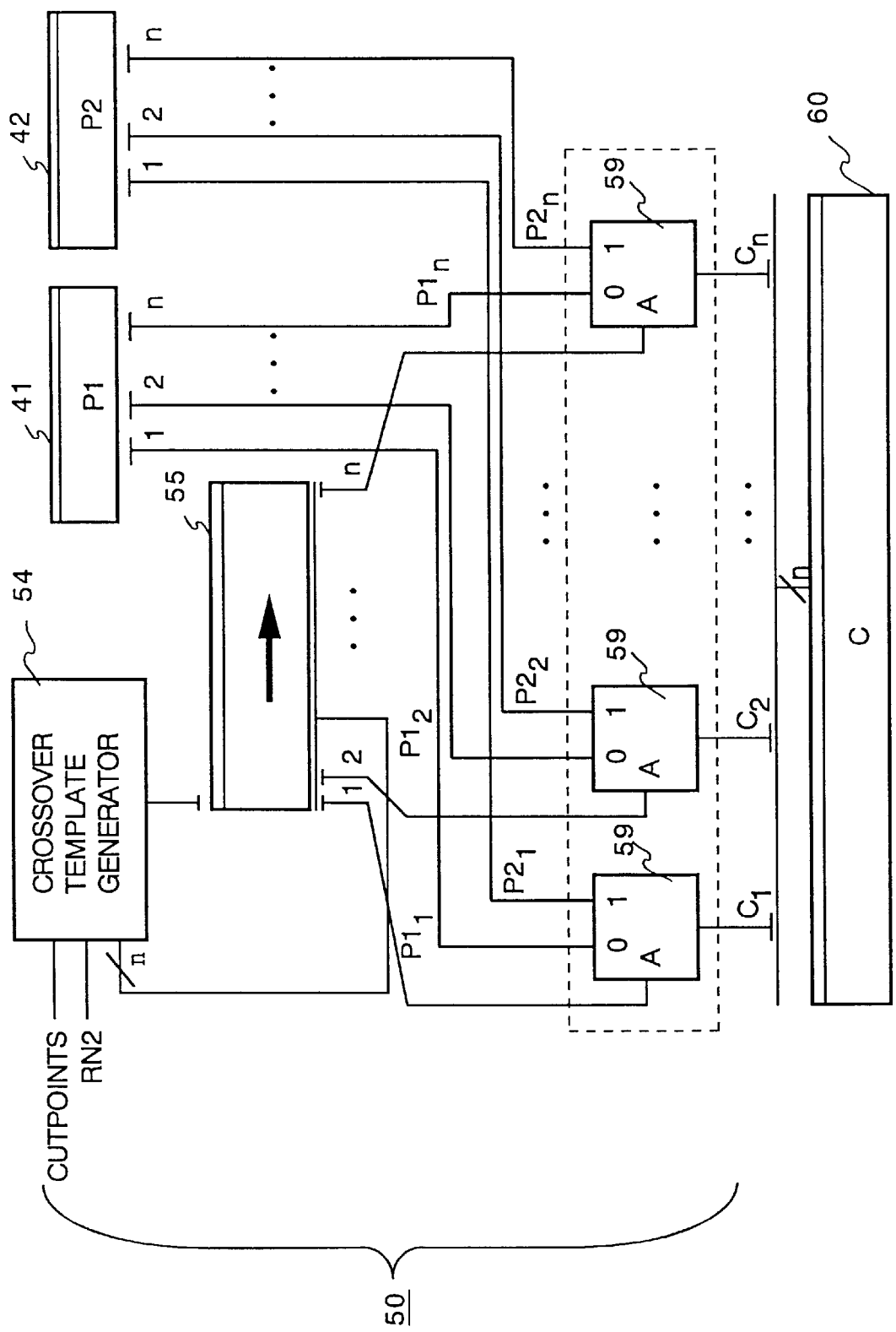
FIG. 9 shows a block diagram of a crossover module 50 of the GA machine of FIG. 1 in detail.

FIG. 9 shows a block diagram of the crossover module 50 in detail.

The function of the crossover module 50 is to produce a new child chromosome. With a single-point crossover having a single cutpoint, the crossover module 50 disassembles the parent chromosomes and then recombines them, taking the left part of one parent chromosome and the right part of the other parent chromosome, to make a new child chromosome. Other forms of crossover, such as those using two, three or more cutpoints, are possible. When multiple cutpoints are used, selection switches between two or more parent chromosomes as cutpoints are encountered. For example, a two-cutpoint crossover process would first select chromosome data from the first parent chromosome, then after the first cutpoint, select chromosome data from the second parent chromosome, and finally after the second cutpoint, select chromosome data from the first parent chromosome again.

The crossover module 50 shows a single-cutpoint crossover including a crossover template generator 54, a crossover template shift register 55, and n number of multiplexers 59. The single-cutpoint crossover is illustrated with parent chromosomes P1, P2, a child chromosome C, and bits 1 through n $P1_f$–$P1_n$ in the bit string of the parent chromosome P1, bits 1 through n $P2_f$–$P2_n$ in the bit string of the parent chromosome P2, and bits 1 through n $C_f$–$C_n$ in the bit string of the child chromosome C. The crossover template generator 54 generates a base serial pattern of a crossover template. The crossover template shift register 55 inputs the serial pattern, shifts the pattern bit by bit and outputs an n-bit crossover template. The multiplexer 59 performs a crossover operation on a parent chromosome based upon the crossover template.

The crossover template generator 54 is now described in detail.

Figure 10:
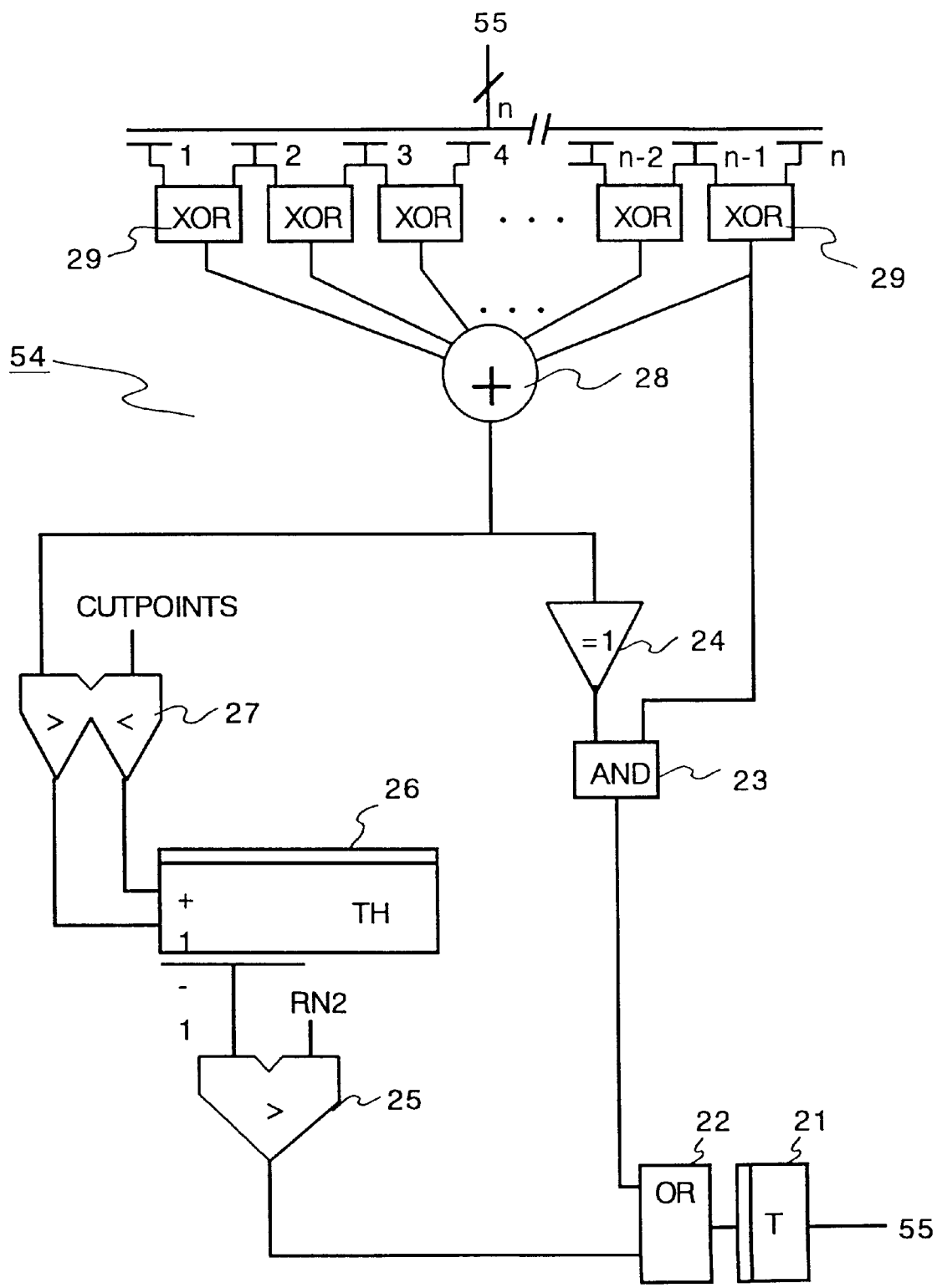
FIG. 10 shows a circuit diagram of a crossover template generator 54 of the crossover module 50 of FIG. 9 in detail.

FIG. 10 shows the crossover template generator 54 of the crossover module of FIG. 9 in detail. The crossover template generator 54 generates the crossover template indicating a cutpoint to regulate the participation of the two parent chromosomes in the crossover process. This participation is regulated by supplying a serial pattern of binary 1s and 0s in the crossover template to the crossover template shift register 55. A cutpoint is represented by a 10 or 01 data pattern so that a cutpoint can be acknowledged by that pattern appearing in the serial pattern. The desired number of cutpoints can be obtained in the template based upon an externally supplied parameter (identified by "CUTPOINTS" in FIG. 10). A cutpoint generation is performed probabilistically controlled by the following four elements.

(1) externally supplied parameter (CUTPOINTS) indicating the number of crosspoints, (2) number of cutpoints currently in the crossover template shift register 55, (3) random number stream generated by a random number generator RN2, and (4) current threshold value held in a threshold counter 26.

An operation of the crossover template generator 54 is now described with reference to FIG. 10.

Starting with the existing serial pattern in the crossover template shift register 55, the current cutpoints are detected by a plurality of n−1 number of XOR gates 29. Since the cutpoint is defined to be either a binary 01 or a 10 pattern as mentioned hereinbefore, the XOR gates 29 detecting either of these patterns output 1s. The XOR gates 29 when not detecting these patterns output 0s. The aggregate of XOR gate outputs is connected to a carry-save-adder 28 which sums the number of inputs that are 1. This provides a binary number representing the number of cutpoints currently in the serial pattern in the crossover template shift register 55.

Figure 11:
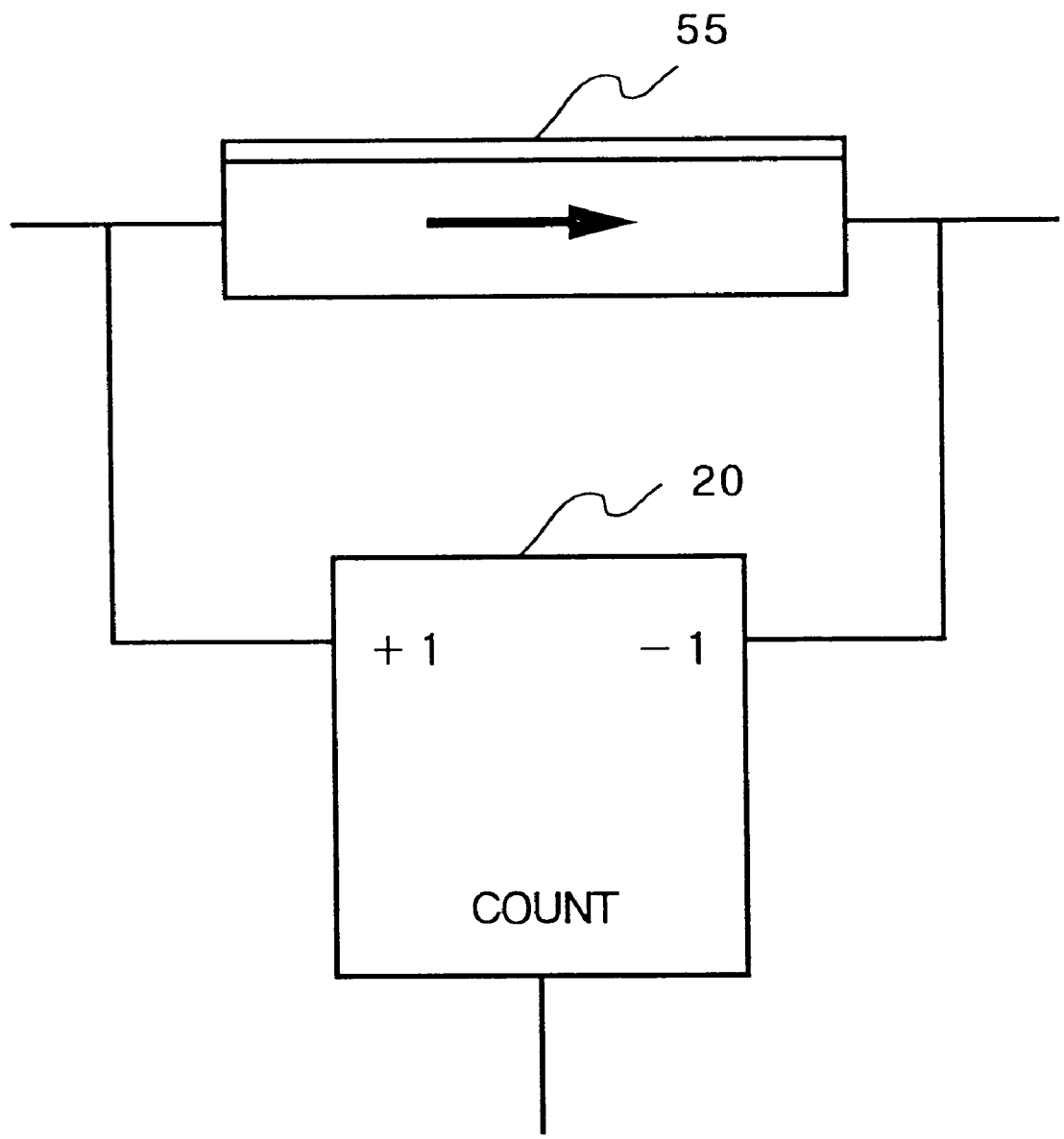
FIG. 11 shows an alternative counter to a counter of the crossover module 50 of FIG. 9.

A similar cutpoint counting as that discussed above can be performed through an alternative counter of FIG. 11 instead of the counter including the XOR gates 29 and the carry-save-adder 28 of FIG. 10. With this alternative counter, the crossover template shift register 55 is reset to 0 and an up/down counter 20 is set to zero prior to a start operation of the machine. When the serial pattern is inputted to the crossover template register 55 from the crossover template generator 54 and then shifted, the up/down counter 20 increments the value of the counter if detecting either of the binary 01 and 10 patterns indicating a cutpoint. When the serial pattern is shifted out of the crossover template register 55, the up/down counter 20 decrements the value of the counter if detecting either of the binary 01 and 10 patterns. Thus, the number of cutpoints currently in the crossover template shift register 55 can be detected by the up/down counter 20.

The number of cutpoints outputted from the counter (the carry-save-adder 28 or the up/down counter 20) is inputted to a cutpoint number comparator 27 where the number of cutpoints from the counter is compared with another input of the desired number of cutpoints represented by the external CUTPOINTS parameter. If the number of cutpoints from the counter is greater than the externally supplied desired number of cutpoints, a decrement signal is sent to a threshold counter 26 in order to decrease a threshold value. If the current number of cutpoints from the counter is less than the desired, an increment signal is sent for incrementing the current threshold value in the threshold counter 26.

The serial pattern of the crossover template is generated by a toggle flip-flop 21 whose input is connected to the output of a threshold comparator 25 via an OR gate 22. A first input to the threshold comparator 25 is a threshold value from the threshold counter 26, and a second input is a random number from the random number generator RN2. The random number generator RN2 generates a random number independent from all other random numbers generated by other random number generators used in the machine. A threshold comparator output is a 1 when the random number is less than the threshold value which causes in turn the toggle flip-flop 21 to change the state of its output. Thus the toggle flip-flop 21 outputs the pattern indicating a cutpoint into the crossover template shift register 55. The process of generating the crossover template provided for the crossover template shift register 55 is thus probabilistically self-regulating. When the number of cutpoints is too many, the threshold value of cutpoint generation is lowered, decreasing the probability of cutpoint generation. When the number of cutpoints is too few, the threshold value is raised, increasing the probability of cutpoint generation. The crossover template generator 54 thus generates the pattern of the crossover template automatically in such a manner that the current number of cutpoints complies with the desired number of cutpoints supplied externally.

An operation of the comparator 24 and AND gates 23 of FIG. 10 is now described.

The AND gate 23 and the comparator 24 compose a circuit for generating a cutpoint pattern in the crossover template in case of no cutpoints provided in the template. If there are no cutpoints in the crossover template in the conventional art, either parent could be potentially copied back into the population memory 30, which reduces the genetic diversity or evolution of the population. This is, in general, disadvantageous to the performance of a GA. This embodiment guarantees that there is always at least one cutpoint in the crossover template. The output of the XOR gate 29 connected to bits n−1 and n is inputted to the AND gate 23. The comparator 24 detects whether the current number of cutpoints outputted from the carry-save-adder 28 is 1. When the comparator detects 1 and also the output of the XOR gate 29 connected to bits n−1 and n is ON, the AND gate outputs 1. The output of the AND gate 23 turns ON only when there is only a single cutpoint locating between bits n−1 and n in the n-bit pattern of the crossover template in the crossover template shift register 55. This indicates there will be no cutpoint in the crossover template shift register 55 in the next cycle or next shift. When detecting such a situation, the circuit composed of the AND gate 23 and the comparator 24 causes to generate the cutpoint pattern in the toggle flip-flop 21 via the OR gate 22. Thus, the cutpoint pattern appears locating between bits 1 and 2 in the crossover template pattern register 55 in the next shift.

Figure 12:
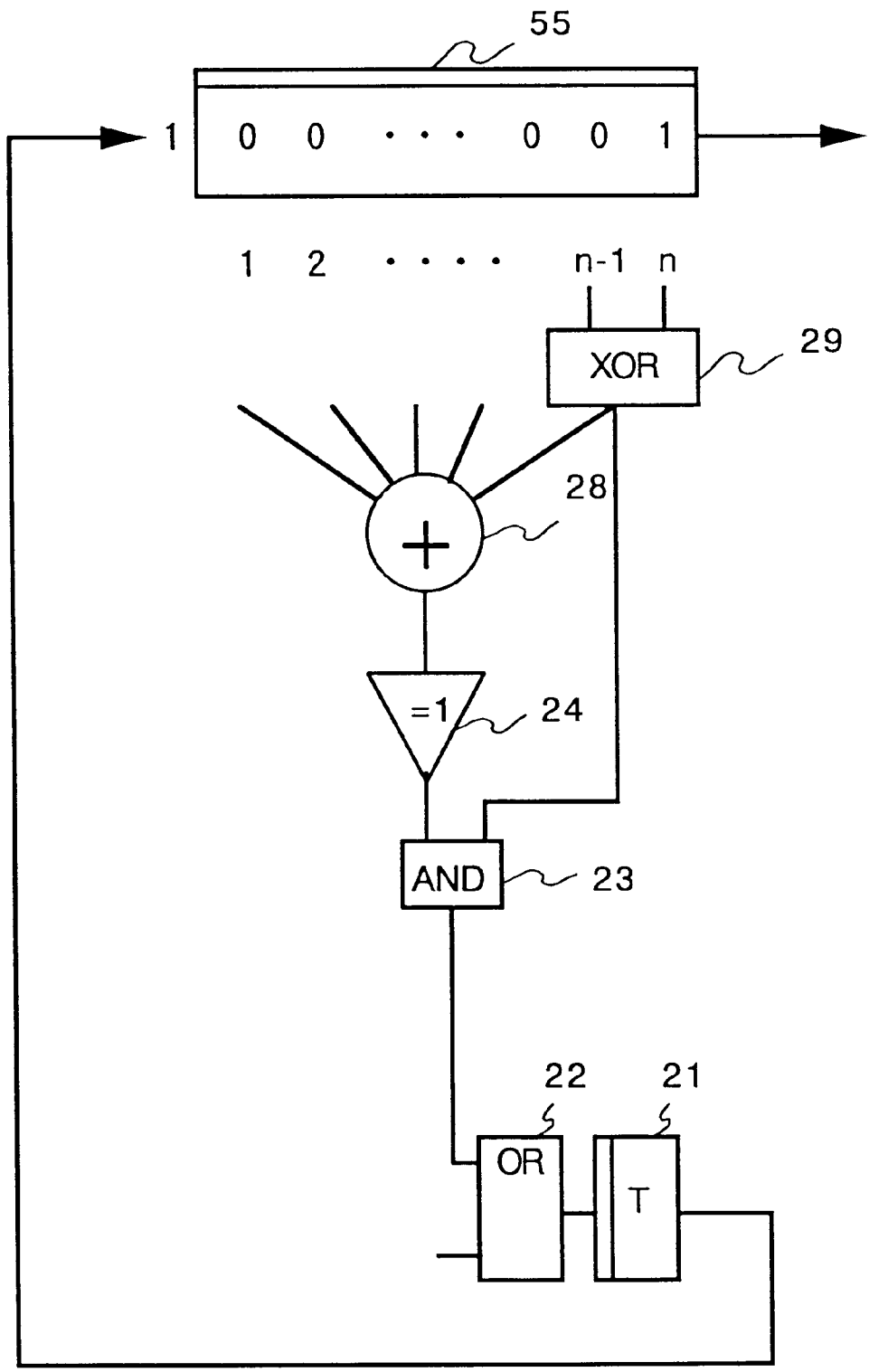
FIG. 12 shows a partial diagram of an alternative crossover template generator to a crossover template generator of the crossover template generator 54 of FIG. 10, illustrating a circuit for forcibly generating a cutpoint-indicating pattern according to the present invention.

FIG. 12 shows the AND gate 23 and comparator 24 detecting the crossover template shift register 55 outputting the last cutpoint. In this situation, the toggle flip-flop 21 generates the pattern indicating a new cutpoint to appear on the next cycle.

The crossover module 50 is now described more in detail further with reference to FIG. 9.

The crossover template generated by the crossover template generator 54 is inputted sequentially to the crossover template shift register 55 and then subjected to a bit-by-bit shifting. A bit-based shifting operation of the crossover template can provide diversity of bit position of the cutpoint in the template, which is essential to the operation of a GA. As the crossover template is shifted one bit to the right in the crossover template shift register 55, a new serial pattern generated by the toggle flip-flop 21 is inputted sequentially at the left-most position of the crossover template shift register 55.

The crossover module 50 includes n number of multiplexers 59 corresponding to the respective bits in the n-bit chromosome. Each multiplexers 59, consisting of two inputs (Input 0 and Input 1) and a single address A, selects an input 0 when the value of address A is 0, and selects an input 1 when the value of address A is 1. Address A of the multiplexer 59 is connected to a corresponding bit in the crossover template shift register 55. When an output signal of the crossover template shift register 55 is a binary 0, data at the corresponding bit position is selected from the first parent chromosome register 41. Conversely, when an output signal of the crossover template shift register 55 is a binary 1, data at the corresponding bit position is selected from the second parent chromosome register 42.

6. Mutator 60

Figure 13:
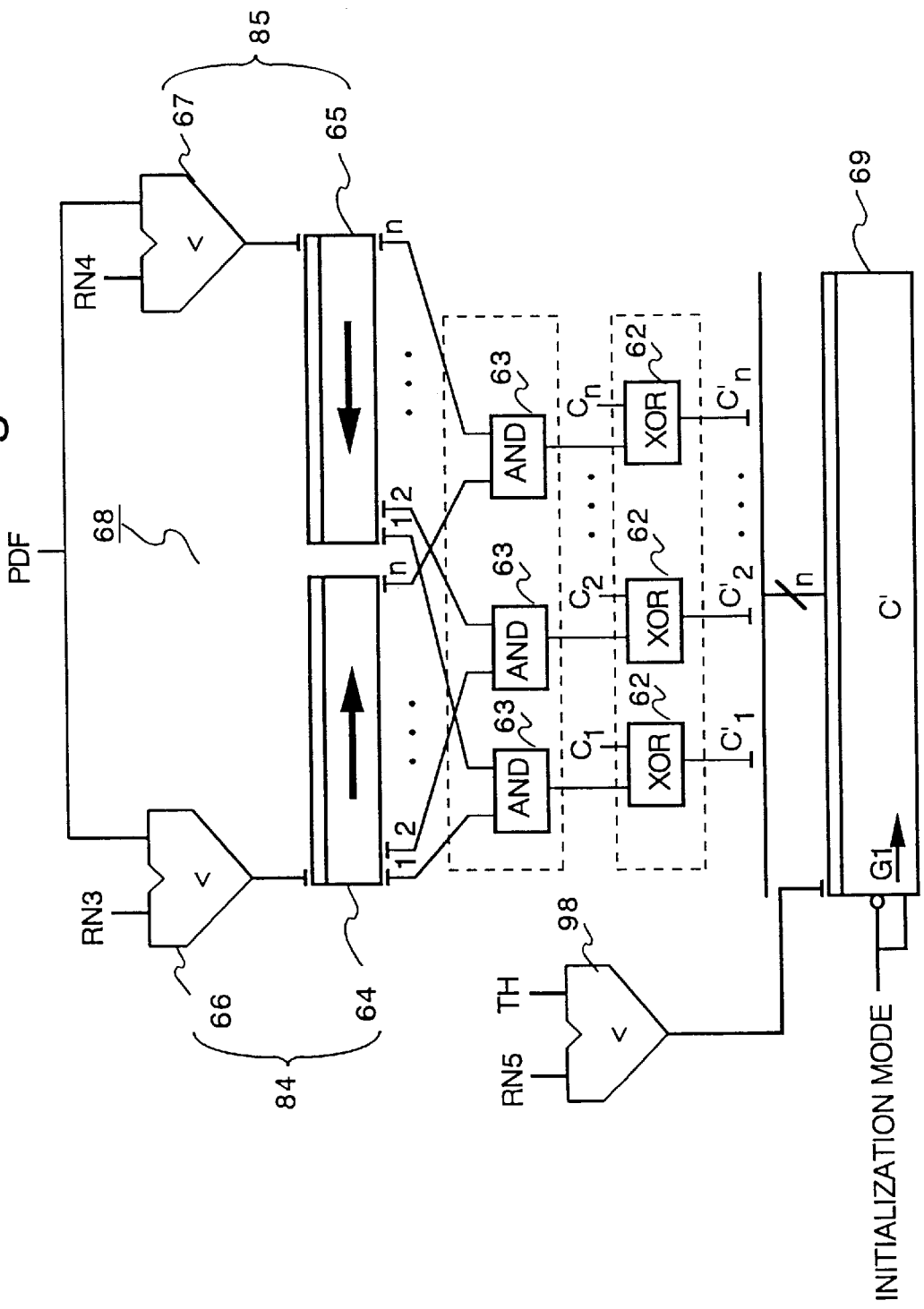
FIG. 13 shows a circuit diagram of a mutation module 68 of a mutation operator 60 of the GA machine of FIG. 1 in detail.

FIG. 13 shows a block diagram of the mutation operator 60 in detail.

A mutation operation is described with bits 1 through n $C_1$–$C_n$ in the bit string of a child chromosome C and bits 1 through n $C'_1$–$C'_n$ in the bit string of a mutated child chromosome C' in FIG. 13.

If the crossover module 50 is the primary operator of a GA, then the mutation operator 60 is a secondary genetic operator. The mutation operator's primary purpose is to provide genetic diversity at a given bit position. According to this embodiment, the mutation is performed on all bits in the child chromosome independently, probabilistically and simultaneously. Mutation is performed through inversion of a bit value, i.e., a 1 changes to a 0 and a 0 changes to a 1. The mutation is performed at a low probability rate typically with 1 per-cent or less. In a hardware implementation of a GA it is desirable that the mutation operation be performed rapidly. In the conventional art, the mutation operation is applied to bits in the chromosome in consideration of the values of all bits in the chromosome or of mutated state of other bits in the chromosome. This hinders the speed of the mutation operation. In this embodiment, all bits are considered in parallel. This allows the mutation operation to be performed in a single machine cycle.

The mutation operator 60 includes a mutation module 68 and a mutated chromosome register 69. The mutation module 68 includes a first pulse stream generator 84, a second pulse stream generator 85, n number of AND gates 63, and n number of XOR gates 62. The first pulse stream generator 84 includes a random number generator RN3, a first shift register 64, and an absolute value comparator 66. The second pulse stream generator 85 includes a random number generator RN4, a second shift register 65, and an absolute value comparator 67. In this embodiment, a random pulse stream is generated respectively from the first and second pulse stream generators 84, 85 based upon two uncorrelated random numbers. The absolute value comparator 66 inputs a random number stream from the random number generator RN3 and compares the random number stream with an externally supplied value representing a given pulse density p, which will be referred to by a PDF (pulse-density-function) parameter hereinafter. The pulse density p represents the probability of 1 in the bit stream of 1s and 0s. For example, when the random number generator RN3 generates random numbers from 1 to 100 together with the pulse density p=10%, the value of the PDF parameter is 10. When the random number is less than a PDF parameter value, an absolute value comparator output is a 1. In other case, an absolute value comparator output is a 0. A bit stream of is and 0s outputted from the absolute value comparator 66 has a 10 per-cent probability of 1s in the stream. The pulse density p is the ratio of a PDF parameter value to the maximum possible value generated by the random number generator RN3. The output of the absolute value comparator 66 is inputted sequentially to the first shift register 64, The first shift register 64 shifts an absolute value comparator output from left to right. A similar operation is performed by the second pulse stream generator 85 and the random number generator RN4, the absolute value comparator 67 and the second shift register 65. Random numbers inputted to the absolute value comparators 66, 67 have no correlation, and therefore, bit stream patterns retained in the first and second shift registers 64, 65 have no correlation.

Figure 14:
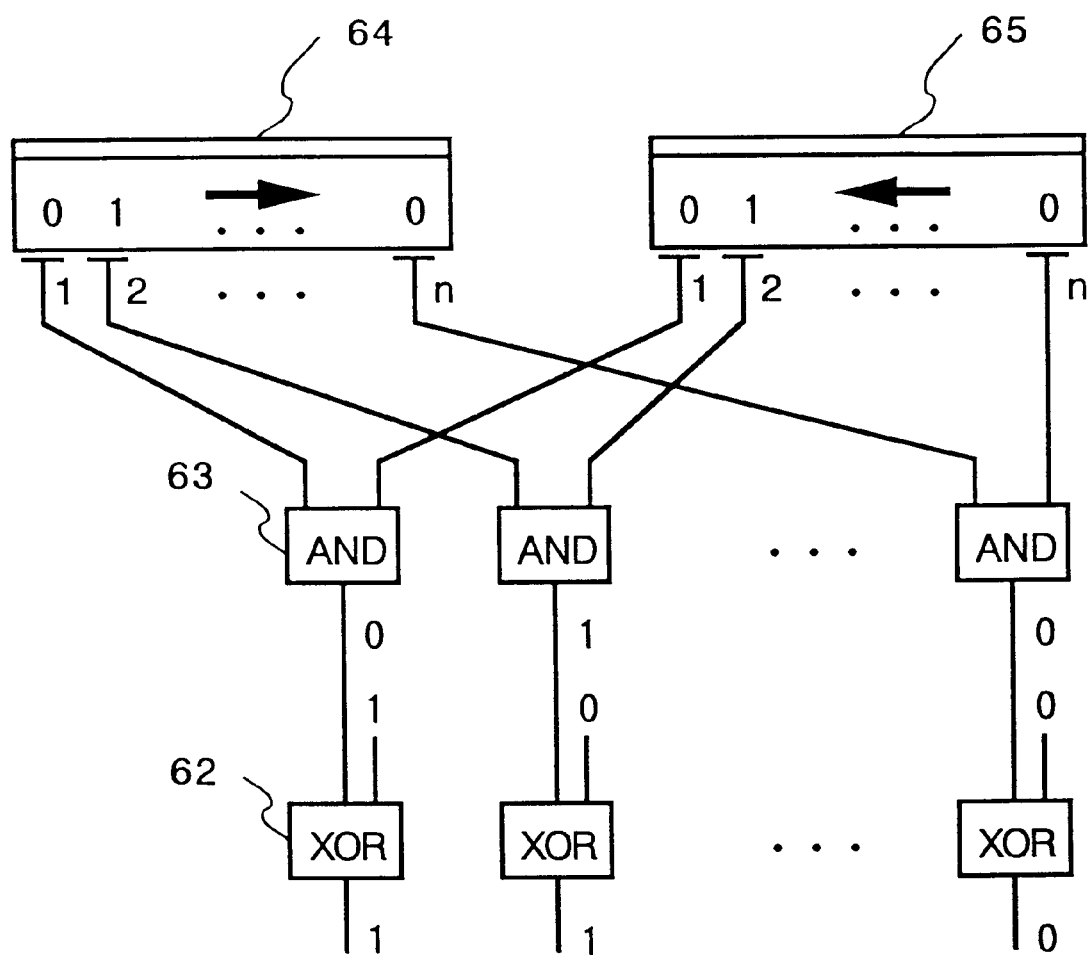
FIG. 14 shows a circuit diagram of the mutation module 68 of FIG. 13 illustrating its mutation operation.

FIG. 14 shows an operation of the mutation module 68 of the mutation operator 60.

Bits in the first and second shift registers 64, 65 are connected to n AND gates 63, with each gate's inputs connected to similar bit positions in each of the shift registers 64, 65. Each AND gate 63 thus inputs bit values, ANDs the bits, and outputs a 1 only when the inputted bit values at the similar bit position in the shift registers 64, 65 are 1s. In FIG. 14, the second AND gate 63 from the left outputs a 1 when inputting values 1s at the second bit positions from the left in the respective shift registers 64, 65. The resultant pulse density of the AND gate output is a product $p^2$ of the pulse densities of the two pulse streams generated by the respective absolute value comparators 66, 67. For example, when the pulse density p is 10 per-cent, the product of the pulse densities $p^2$ of the two pulse streams is one per-cent (10%×10%=1%). Outputs from the AND gate 63 together with outputs from the crossover module 50 are inputted to the n XOR gates 62, where the child chromosome datum at a specific bit position is mutated. When the output of the AND gate 63 is a 1, the XOR gate 62 performs a mutation. In FIG. 14, only with the second XOR gate 62 from the left mutation is performed on the second bit from the left. The XOR gate 62, when inputting a 1 from the AND gate 63, inverts a bit of the child chromosome data pattern in the corresponding bit position to the AND gate 63. When inputting a 0 from the AND gate 63, the XOR gate 62 outputs the corresponding bit of the child chromosome bit pattern with no inversion. A child chromosome having an inverted bit is outputted from the XOR gates 62 and inputted to the mutated chromosome register 69 for temporary storage.

The mutated chromosome register 69 has two input types, parallel input and serial input, controlled by the gate G1. Normally with selection mode, the parallel input is selected. In the initialization mode, serial input is selected so that data are inputted sequentially from a private absolute value comparator 98 to the mutated chromosome register 69 and then shifted bit by bit. The serial input will be described in detail hereinafter.

Thus, the XOR gates 62 mutate the respective bits of a child chromosome independently in parallel with no correlation between the bits.

7. Fitness function circuit 70

Figure 15:
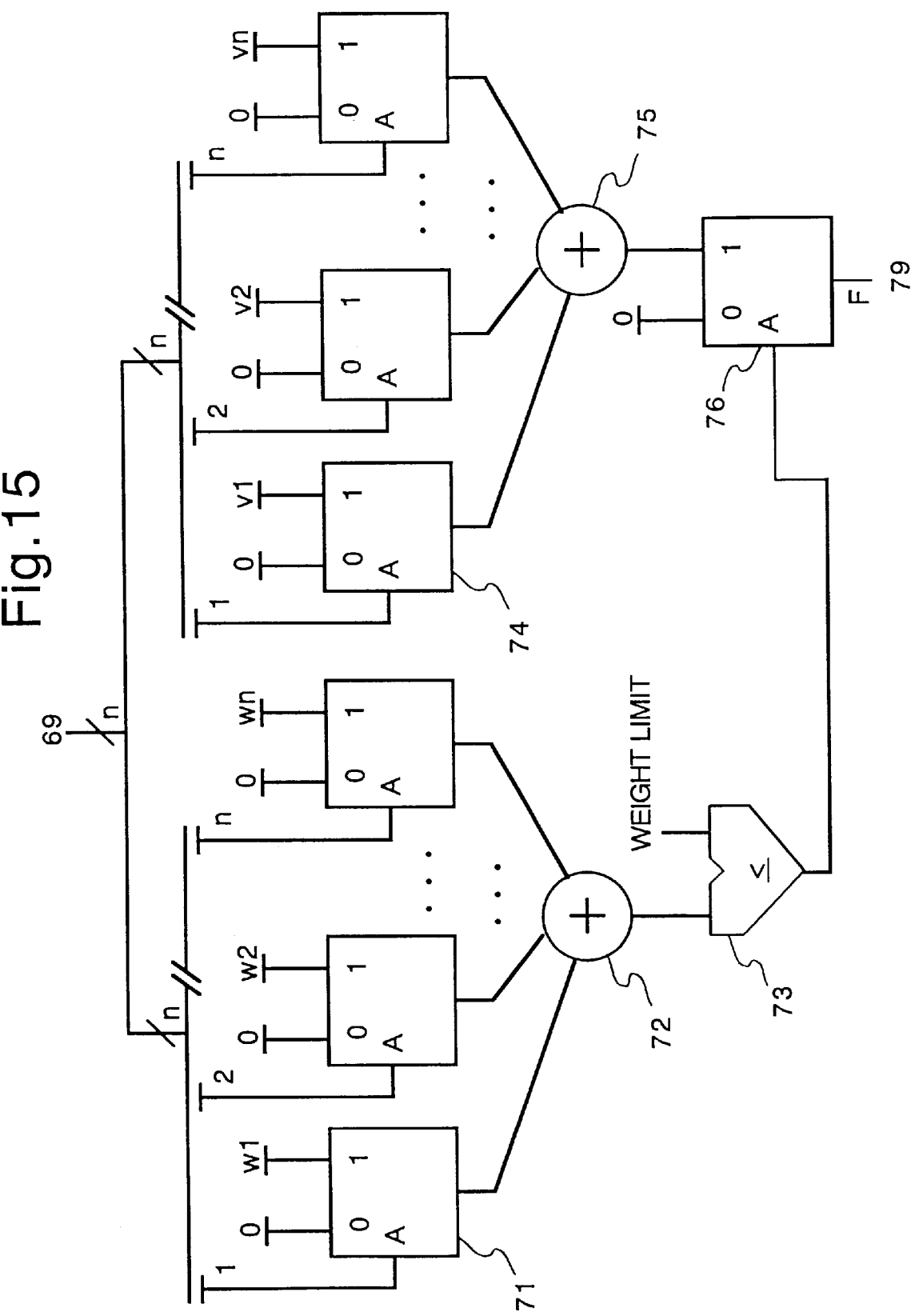
FIG. 15 shows a fitness function circuit 70 of the GA machine of FIG. 1.

FIG. 15 shows the fitness function circuit 70 in detail.

The fitness function circuit 70 of FIG. 15 is applied specifically to a knapsack problem. The knapsack problem proposes that there are n items of various weights and values and the objective is to fill a knapsack with the maximum value collection of items without exceeding the weight limit of the knapsack. With the knapsack problem as an exemplary problem the fitness function circuit is described here.

For the chromosome's data structure a single bit in the chromosome is assigned to each of n number of items. If an item's bit in the chromosome is a 1, then it is selected for inclusion in the knapsack, if it is a 0, then it is to be left out.

As a fitness used here the total value of items in the knapsack with the restriction that if the weight exceeds the weight limit, the value will be set to zero. The fitness function circuit 70 of FIG. 15 sums the weight of selected items in the knapsack and outputs a summed value as the fitness value of the chromosome. The fitness function circuit 70 of FIG. 15 includes a plurality of n multiplexers 71. An address A of each multiplexer 71 is connected to its corresponding bit in the n-bit chromosome. If the corresponding bit is a 0, then the multiplexer 71 selects 0 as its output value. This means that there is no item selected and therefore weight 0 is outputted. If the corresponding bit is a 1, then the multiplexer 71 outputs the weight of the item selected. Outputs of all of the multiplexers 71 are inputted to a carry-save-adder 72 which sums the weight of all items. A weight comparator 73 compares the total weight outputted from the carry-save-adder 72 to the weight limit of the knapsack (identified by WEIGHT LIMIT in FIG. 15). As long as it is equal to or less than the weight limit of the knapsack then the weight comparator 73 outputs a 1.

The fitness function circuit 70 also includes a plurality of n multiplexers 74 and carry-save-adder 75 arranged therein in the same manner as the plurality of multiplexers 71 and the carry-save-adder 72. The multiplexers 74 outputs the values of selected items and then the carry-save-adder 75 outputs the total value of all selected items in the knapsack. A multiplexer 76 outputs a 0 as a fitness value 78 when the total weight is more than the weight limit, and otherwise, outputs the total value outputted from the carry-save-adder 75 as the fitness value 78.

The fitness function circuit 70 of FIG. 15 is designed specifically to solve the knapsack problem. There are other problems to be solved by GAs through other types of problem-specific fitness function circuits than the fitness function circuit 70. The fitness function circuit 70 generally includes reconfigurable IC based synthetic devices of VLSI or FPGA, etc. The fitness function circuit 70 is a removable device which can be mounted on the fitness function circuit mount 95. Alternatively, the fitness function circuit 70 can be fixed, soldered, for example, on the fitness function circuit mount 95. By applying other possible evaluation approaches to the fitness function circuit 70, the GA machine of this invention can easily become a multi-functional or multi-purpose machine applicable to various problems.

8. Survival comparator 80

The survival comparator 80 is provided for storing a newly generated child chromosome in the population memory 30. The survival comparator 80 detects whether the fitness of a newly generated child chromosome is greater than the fitness of any chromosome in the population memory 30. In this embodiment as mentioned earlier, the least-fit chromosome of all parent chromosomes in the first chromosome register 41 is replaced by a newly generated child chromosome.

Figure 16:
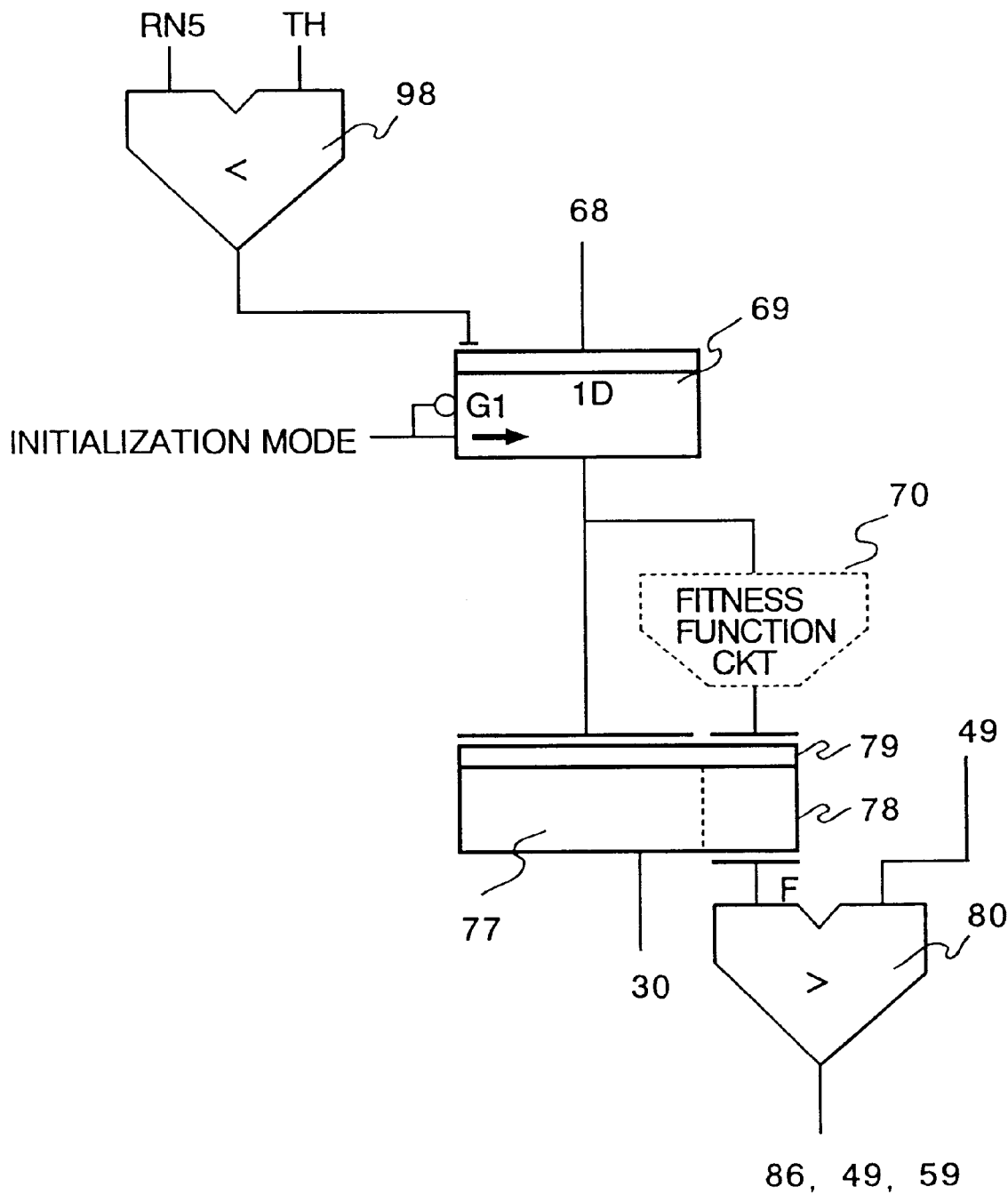
FIG. 16 shows a circuit diagram of a survival comparator 80 of the GA machine of FIG. 1 and its neighboring circuits.
Figure 17:
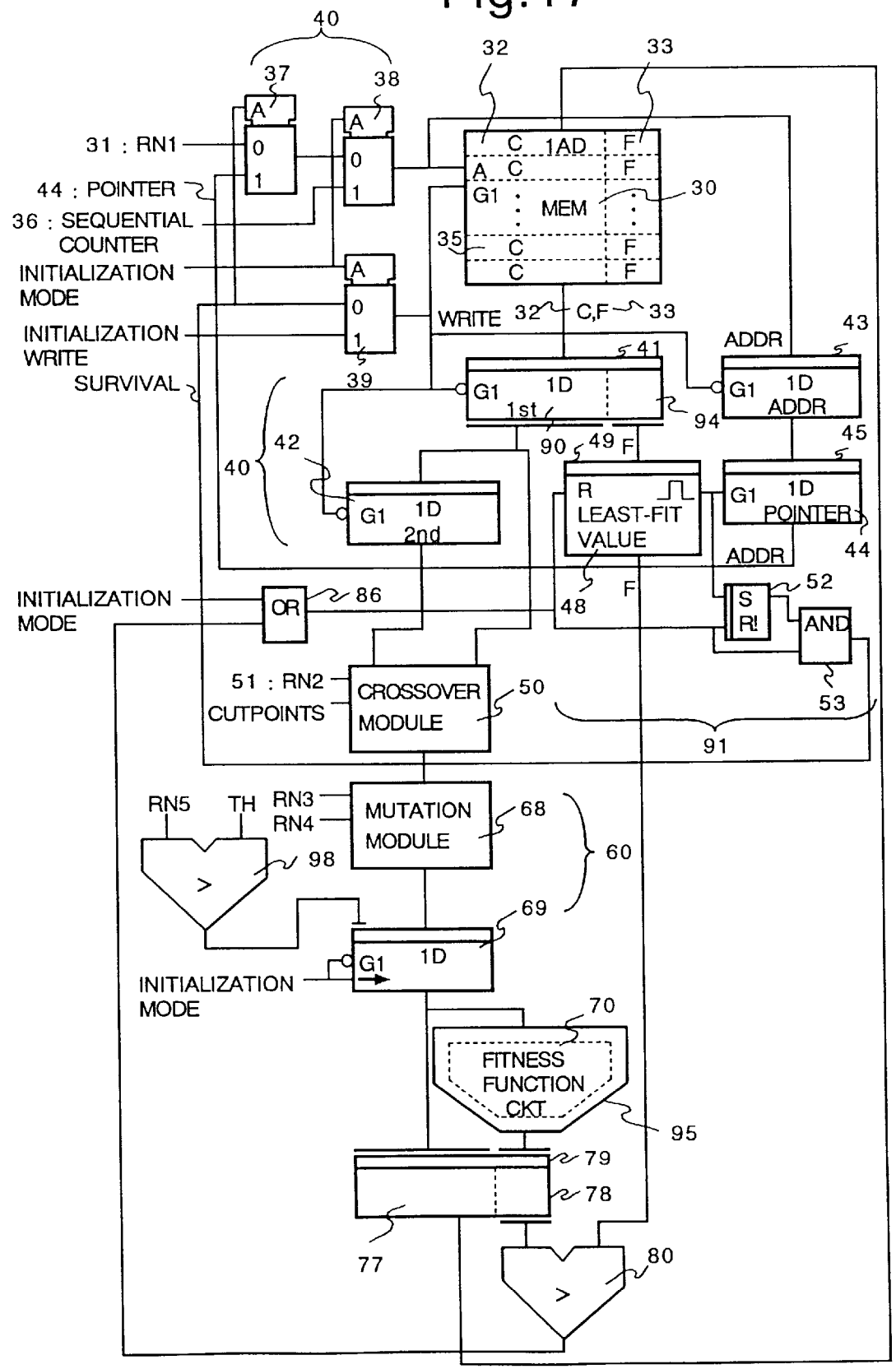
FIG. 17 shows an overall view of the GA machine of FIG. 1 in detail.

FIG. 16 shows the survival comparator 80 and its neighboring circuits.

One input of the survival comparator 80 is connected to the output of the fitness value 78 of the evaluated chromosome register 79 and the other input is connected to the least-fit value register 49. The least-fit value register 49 holds the least-fit value 48 which is the fitness value 94 of the parent chromosome 90 whose fitness is the least of all fitness values 94 of the parent chromosomes 90 loaded in the first chromosome register 41 after the previous update of a chromosome by a child chromosome in the population memory 30 in the previous survival mode. The evaluated chromosome register 79 holds a mutated chromosome outputted from the mutated chromosome register 69 as an evaluated chromosome 77 when the fitness of the mutated chromosome is evaluated in the fitness function circuit 70. If the fitness value 78 of the evaluated chromosome is greater than the least-fit value 48 in the least-fit value register 49, then the output of the survival comparator 80 is a 1. This survival comparator's output is a survival signal to generate the survival mode. If the least-fit pointer 44 in the least-fit pointer register 45 is valid, then the evaluated chromosome 77 and its fitness value 78 in the evaluated chromosome register 79 are transferred to the population memory 30 at the address specified by the least-fit pointer 44. If the fitness value 78 is less than the least-fit value 48 in the least-fit value register 49, then the evaluated chromosome 77 and its fitness value 78 are ignored and discarded. If the value of the least-fit pointer 44 identified by an AND gate 53 is invalid, then the evaluated chromosome 77 and its fitness value 78 are also ignored and discarded.

9. Overall Configuration

FIG. 17 shows the overall view of the GA machine of FIG. 1 in detail putting all composing elements of the GA machine described singly hereinbefore and the fitness function circuit 70 together.

The execution process of a GA of this embodiment is summarized as follows.

(1) initialization of the population memory 30,
(2) selection of parent chromosomes,
(3) crossover,
(4) mutation,
(5) fitness evaluation, and
(6) survival determination.

These respective operations are repeated until no new or improved solution is generated or a predetermined period or predetermined times is exceeded. Typically, many solution attempts can be made for a single problem with various conditions such as:

(1) the density of is in the random pattern of chromosome of 0s and is in the initialization of the population memory 30,
(2) the number of cutpoints, and
(3) the mutation rate being varied with each attempt in a plurality of attempts made for a single problem, and even, the mutation rate being varied dynamically within the attempt.

These parameters can be provided by an external source such as an operator and any computer. The external source is not considered in this embodiment and not claimed as part of this invention because the external source is not particularly significant or relevant to the subject of this invention. Likewise, not claimed is the random number generators whose implementations such as external supply of parameters and random number generation are various and would be apparent to those who are skilled in the art of digital system design. The only significant feature of the random number generators here is the generation of uncorrelated random numbers.

10. Initialization Circuit

To begin the process in the machine, the population memory 30 must be initialized as mentioned hereinbefore. The initialization is to fill the population memory 30 with a randomly generated population of chromosomes and their respective fitnesses.

The initialization circuit of this embodiment utilizes the mutated chromosome register 69, fitness function circuit 70, evaluated chromosome register 79, etc. The mutated chromosome register 69 in FIG. 13 has parallel and serial data input modes. When the initialization mode signal is OFF, the mutated chromosome register 69 inputs the outputs of the respective n XOR gates 62 in parallel. When the initialization mode signal is ON, the mutated chromosome register 69 inputs a serial pattern outputted sequentially from the absolute value comparator 98 is inputted and then shifts the incoming bit stream of the serial pattern bit by bit from the left to the right. Especially in the initialization mode, a threshold (TH) parameter representing the density of 1s of a random chromosome bit pattern of 0s and is is inputted to the absolute value comparator 98. The operation of the absolute value comparator 98 is similar to that of the absolute value comparator 66. By varying the value of the threshold (TH) parameter different types of random bit streams can be generated.

When a random bit stream is inputted in serial to the mutated chromosome register 69 in such a manner, the fitness function circuit 70 evaluates the random pattern in the mutated chromosome register 69 and outputs its evaluated value in every machine cycle. The evaluated chromosome register 79 retains the evaluated chromosome 77 and its fitness value 78 in such a manner described hereinbefore. The value of the least-fit value 48 in the survival comparator 80 is cleared to zero in the initialization mode when the initialization mode signal is inputted to the least-fit value register 49 via the OR gate 86. This generates the survival mode as a comparison result of the survival comparator 80. Then the evaluated chromosome 77 and its fitness value 78 in the evaluated chromosome register 79 are written into the population memory 30.

With reference to FIG. 4, when the machine is set to the initialization mode, the sequential counter 36 is set to zero. Random data will then be shifted into the mutated chromosome register 69 until it is filled. Once it is filled, an initial write signal is generated at the write enable timing of the evaluated chromosome 77 and its fitness value 78 into the population memory 30 from the survival comparator 80. The evaluated random chromosome 77 and its fitness value 78 is written into the population memory 30, at the address specified by the sequential counter 36. The sequential counter 36 specifies the address of the adjacent consecutive space for a new chromosome to be written by incrementing its value by a 1 in every writing of chromosome into the population memory 30. In this embodiment, a new chromosome is written into the population memory 30 in every bit-by-bit right shift of data in the mutated chromosome register 69. This provides high speed initialization process of the population memory 30, which is an essential part of a GA. In this embodiment, an initialization period is proportional to the number of words in the population memory 30 as opposed to the number of bits in the population memory 30 from which the initialization period is independent. It is possible to wait for the mutated chromosome register 69 to be completely refilled with new random data of n-bit stream before the new chromosome is written into the population memory 30. But the initialization speed of this method is n times slower than the bit-by bit shift initialization method discussed hereinbefore to write a chromosome into the population memory 30. In this embodiment, one chromosome is generated in every machine cycle. This is advantageous to improve the initialization speed. The initialization process ends when the population memory 30 becomes full with child chromosomes. The machine is now ready to begin processing the selection mode operation.

FIG. 18 shows a chart illustrating an overall operation of the GA machine of this embodiment.

The chart is drawn with each units of the GA machine vertically and horizontally with machine cycles from the beginning of the selection mode upon leaving initialization mode.

In the chart of FIG. 18, parent chromosomes are designated by P1 through P10, child chromosomes by C1 through C9, and mutated chromosomes by C'1 through C'7. The addresses of the parent chromosomes P1 through P10 are designated respectively by P1A through P10A and numerals in the chart indicate the fitness values of the respective chromosomes.

On a first cycle #1, the random number generator 31 is selected as an address source to supply an address to the population memory 30. Then the parent chromosome P1 at the address supplied by the random number generator 31 is read out to the first chromosome register 41 and the address P1A of the parent chromosome P1 is transferred to the population memory address register 43 to be retained.

On a second cycle #2, the parent chromosome P1 in the first chromosome register 41 is transferred to the second chromosome register 42. The fitness value 94 (value 100) in the first chromosome register 41 is compared with the least-fit value 48 in the least-fit value register 49. The value of the least-fit value register 49 is to be initialized to all is upon leaving initialization mode. In FIG. 18, the value is set to the maximum value 1023. Therefore, the fitness value 94 (value 100) in the first chromosome register 41 is transferred to the least-fit register 49. Whenever a new value is set, the least-fit value register 49 generates a pulse. The pulse is outputted to the least-fit pointer register 45 where the least-fit pointer 44 is set thereupon. The address held in the population memory address register 43 is loaded into the least-fit pointer register 45 to set the least-fit pointer 44. The population memory address register 43 holds the address of the parent chromosome 90 that was previously in the first chromosome register 41.

Further on cycle #2, the least-fit pointer-valid flip-flop 52 is reset and the new parent chromosome P2 is read out to the first chromosome register 41.

Still further on cycle #2, the crossover is performed on parent chromosomes P1 and P2 to create a child chromosome C1. The resultant child chromosome C1 is then passed on to the mutation operator 60 for mutation.

On a third cycle #3, the resultant mutated child chromosome C'1 is loaded into the mutated chromosome register 69 from the mutation module 68. The mutated child chromosome C'1 is then evaluated by the fitness function circuit 70. On cycle #3, the previous value 100 of the least-fit value register 49 is replaced by a new value 99.

On a fourth cycle #4, the evaluated chromosome 77 along with its fitness value 78 (value 10) is loaded into the evaluated chromosome register 79 where the fitness value 78 (value 10) is compared with the fitness value (value 99) of the least-fit chromosome 35 in the least-fit value register 49. If the child chromosome is more fit, the child chromosome is written into the population memory 30 at the location supplied by the least-fit pointer 44 in the least-fit pointer register 45.

In FIG. 18, on the fourth cycle #4 through a seventh cycle #7, the fitness values 78 (values 10, 20, 30, 40) of the mutated child chromosomes C'1 through C'4 are less than the fitness values 48 (values 99, 98, 70) in the least-fit value register 49. In this case, the mutated child chromosomes C'1 through C'4 are discarded with no mode change to survival. Next on an eighth cycle #8, the fitness value 78 (value 150) of the mutated child chromosome C'5 is more than the least-fit value 48 (value 70), then the survival comparator 80 outputs a 1 as the survival signal.

Next on a ninth cycle #9 with the survival signal 1, the mode turns to survival. When a child chromosome C'5 is written into the population memory 30, the first and second chromosome registers 41, 42 suspend their reading operations. The least-fit pointer-valid flip-flop 52 is reset, which resets the value in the least-fit value register 49 to be initialized to the maximum value 1023. The reset of the least-fit pointer-valid flip-flop 52 invalidates the least-fit pointer 44 in the least-fit pointer register 45, although the content of the least-fit pointer 44 remains unchanged.

On cycle #9, crossover and mutation are performed with the first and second chromosome registers 41, 42 suspending their reading operation and their contents unchanged. With the same parent chromosomes P7, P8 used as those in the previous operation, a child chromosome is created different from that in the previous operation because the cutpoint for crossover varies and the bit location for mutation varies. With reference to the chart of FIG. 18, a child chromosome Ca7 is created using parent chromosomes P7, P8 on cycle #8 and on cycle #9, a child Cb7 is created using the same parent chromosomes P7, P8. The child chromosomes Ca7, Cb7 are mutated to become mutated child chromosomes Ca'7, Cb'7 respectively. Thus, a new child chromosome can be constantly created on each cycle even with the first and second chromosome registers 41, 42 suspending their reading.

The GA machine described in this embodiment can be varied within the scope of the present invention. The following is the proposal of a possible variation of the population memory 30.

The population memory 30 is not necessarily be centralized having a single large memory space but be decentralized having a plurality of memory spaces distributed in the region. The decentralized type of the population memory may have the disadvantage of complicated addressing circuit but the advantage of flexible data storage and easy implementation of additional memory spaces when necessary.

An alternative selector to the selector 40 is now discussed.

In this embodiment, a relative least-fit value of the least-fit value 48 in the least-fit value register 49 is used for the survival comparison. The selector 40 detects the least-fit chromosome of all selected parent chromosomes loaded in the first chromosome register 41 which corresponds to the less-fit member 35 of the chromosomes 32 in the population. In contrast to the relative least-fit value, an absolute least-fit value of the least-fit chromosome of all chromosomes 32 in the population may be used instead with an alternative selector. The alternative selector detects an absolute least-fit value of all fitness values 33 of chromosomes 32 through implementation of a hardware circuit or sort algorithm, etc. designed specifically to detect and store the absolute least-fit value.

Another alternative selector to the selector 40 may be a selector which selects a parent chromosome based upon its priority, instead of the random parent selection of this embodiment. The selection priority of chromosome is decided based upon the fitness value 33 of the chromosome 32. The priority-based selection allows parent chromosomes to be selected with various rates of probability.

An alternative crossover module to the crossover module 50 of FIG. 9 is now discussed with reference to FIG. 19.

Figure 19:
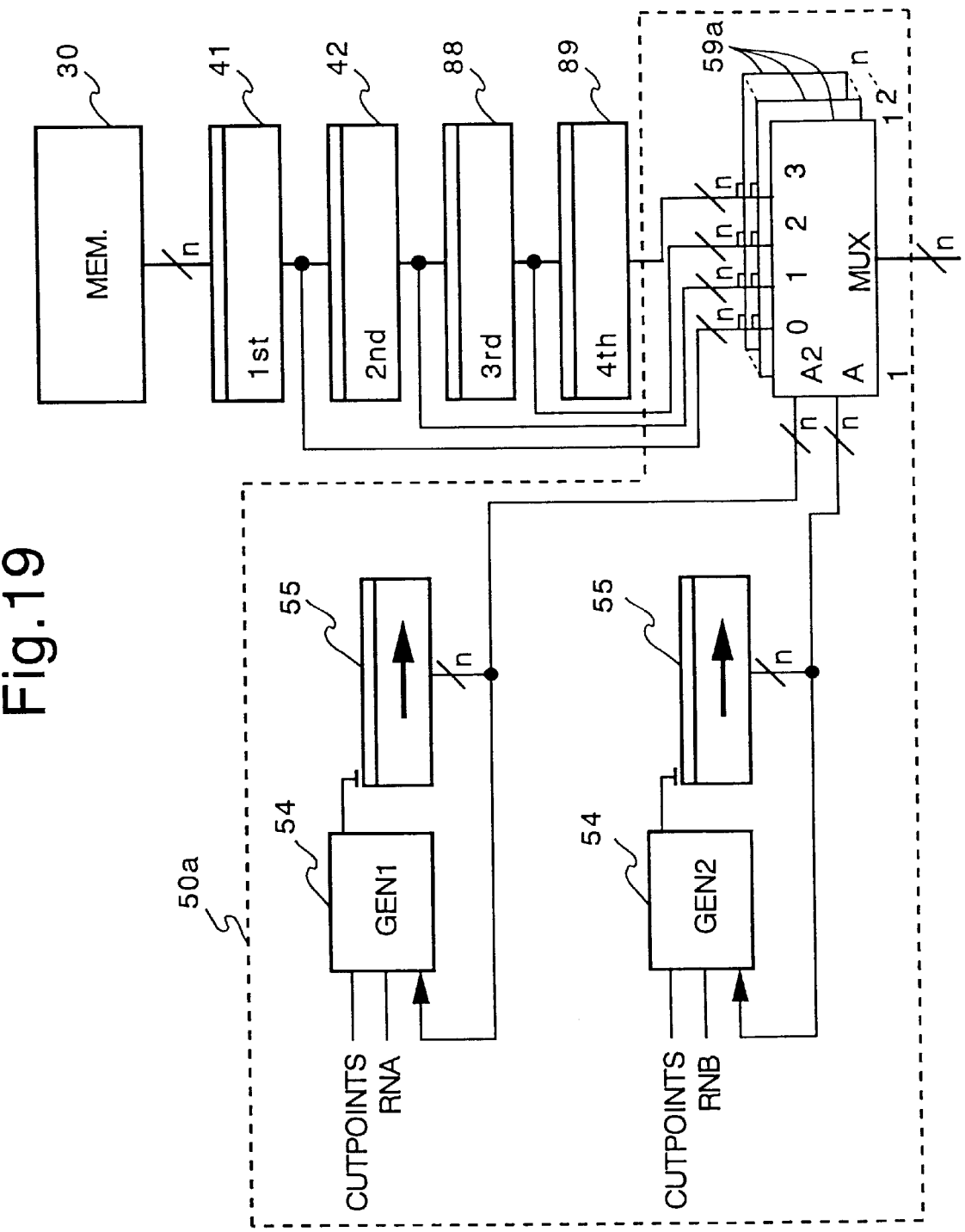
FIG. 19 shows a circuit diagram illustrating a crossover operation with four chromosomes according to the present invention.

FIG. 19 shows a crossover module 50a which performs a crossover operation using four parent chromosomes.

In FIG. 19, the first chromosome register 41 is connected to an input 0 of a multiplexer 59a.

The second chromosome register 42 is connected to an input 1 of the multiplexer 59a.

A third chromosome register 88 is connected to an input 2 of the multiplexer 59a.

A fourth chromosome register 89 is connected to an input 3 of the multiplexer 59a.

A plurality of n number of multiplexers 59a input two n-bit crossover templates respectively at respective addresses A1, A2 and select any one of four input ports 0 through 3 according to a rule of FIG. 20. A child chromosome is thus created by selecting one of the four chromosome registers 41, 42, 88, 89. Thus the crossover operation can be performed on a plurality of parent chromosomes through a similar process described with the crossover module of FIG. 19.

Figure 21:
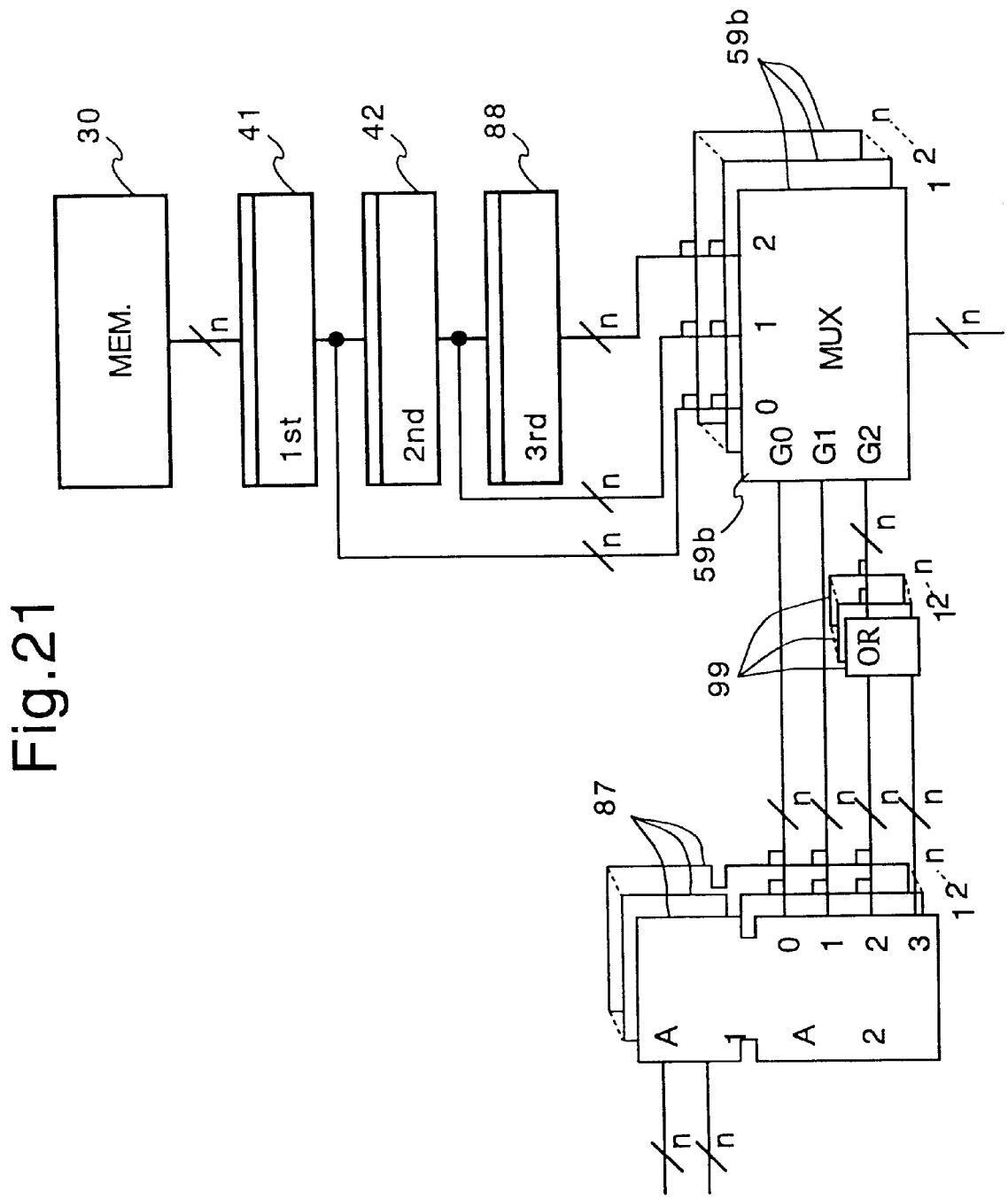
FIG. 21 shows a circuit diagram illustrating a crossover operation with three chromosomes according to the present invention.

FIG. 21 shows another alternative crossover module for a crossover operation with three parent chromosomes. The crossover operation is performed through n number of multiplexers 59b, one for each bit in the chromosome, each including three gates G0, G1, G2 and three input ports 0, 1, 2. Each multiplexer 59b selects one of the input ports 0, 1, 2, controlled by a gate input of the gates G1, G2, G3 according to a rule of FIG. 22. A plurality of n decoders 87 input two n-bit crossover templates, each decoder 87 inputting the two templates respectively at addresses A1, A2, and then selecting one of four output ports 0, 1, 2, 3 according to the rule of FIG. 22. The output ports 2, 3 are connected to the gate G2 of the multiplexer 59b via a corresponding one of n number of OR gates 99. A three-parent crossover is thus performed using the rule of FIG. 22.

In a similar manner, a crossover operation can be performed with five or more parent chromosomes, the operation of which is not shown in the figure. If q (q≧2) number of parent chromosomes are used for crossover, $\log_2^q$ (decimals raised to the next whole number) number of crossover template shift registers 55 are required. In this case, values outputted from the respective crossover template shift registers 55 decide which chromosomes among q parent chromosomes should be used for a crossover operation to create a child chromosome.

Other possible alternative crossover modules to the crossover module 50 are now considered.

A crossover module may perform a multi-cutpoint crossover instead of the single-cutpoint crossover described hereinbefore. A child chromosome can be copied from either of parent chromosomes when required, instead of being created through a cutpoint generation in case of no cutpoint available discussed hereinbefore.

An alternative mutation operator to the mutation operator 60 is now discussed.

Mutation may not always be a must as the 1-bit mutation discussed hereinbefore. A child chromosome created by the crossover module 50 can be transferred directly to the mutated chromosome register 79 for a fitness evaluation.

An alternative initialization circuit to the initialization circuit of FIG. 13 is now discussed with reference to FIGS. 23 and 24.

Figure 23:
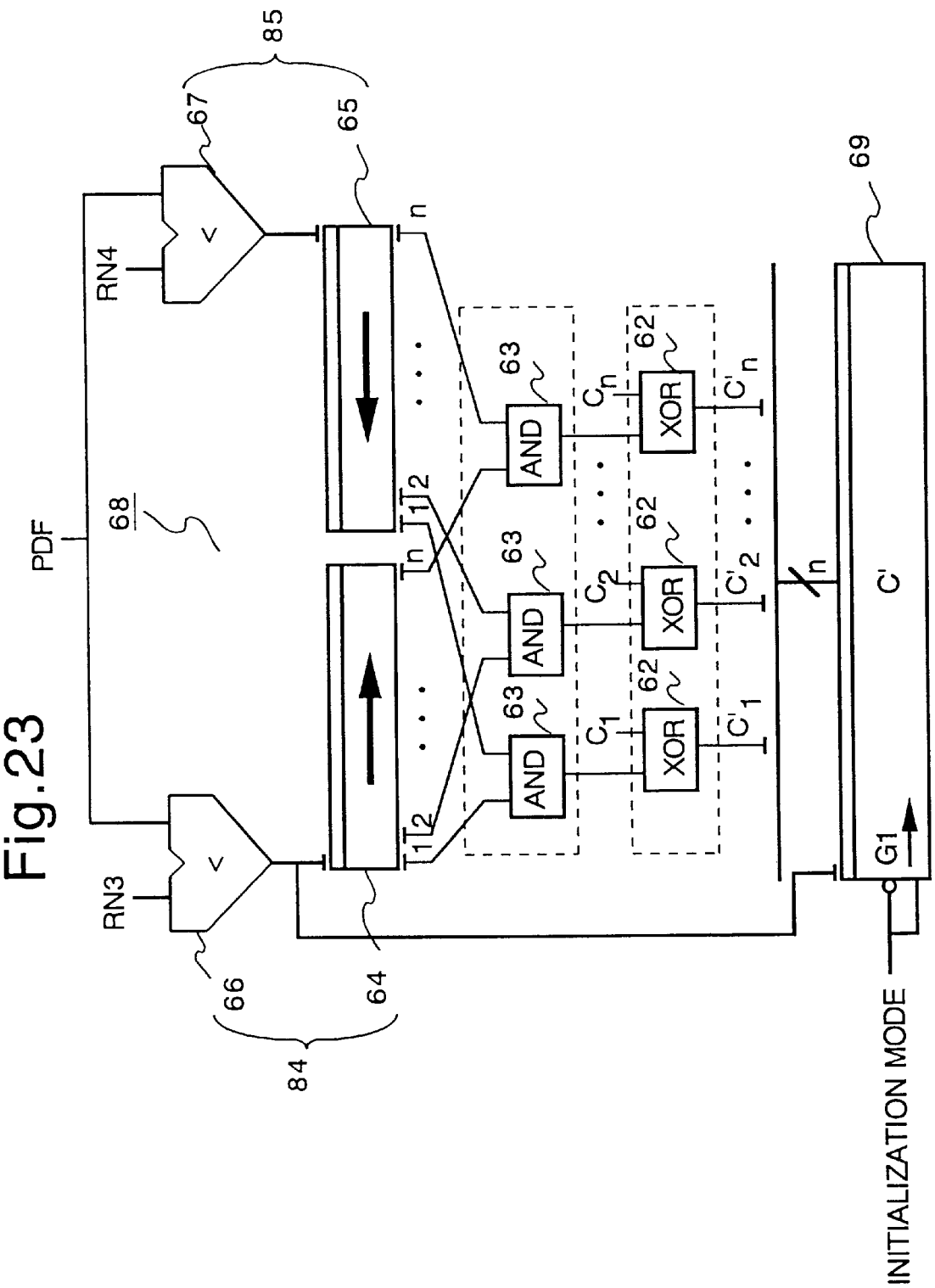
FIG. 23 shows a circuit diagram illustrating an alternative initialization circuit to the initialization circuit of FIG. 13.

FIG. 23 shows an alternative initialization circuit according to this embodiment.

Figure 24:
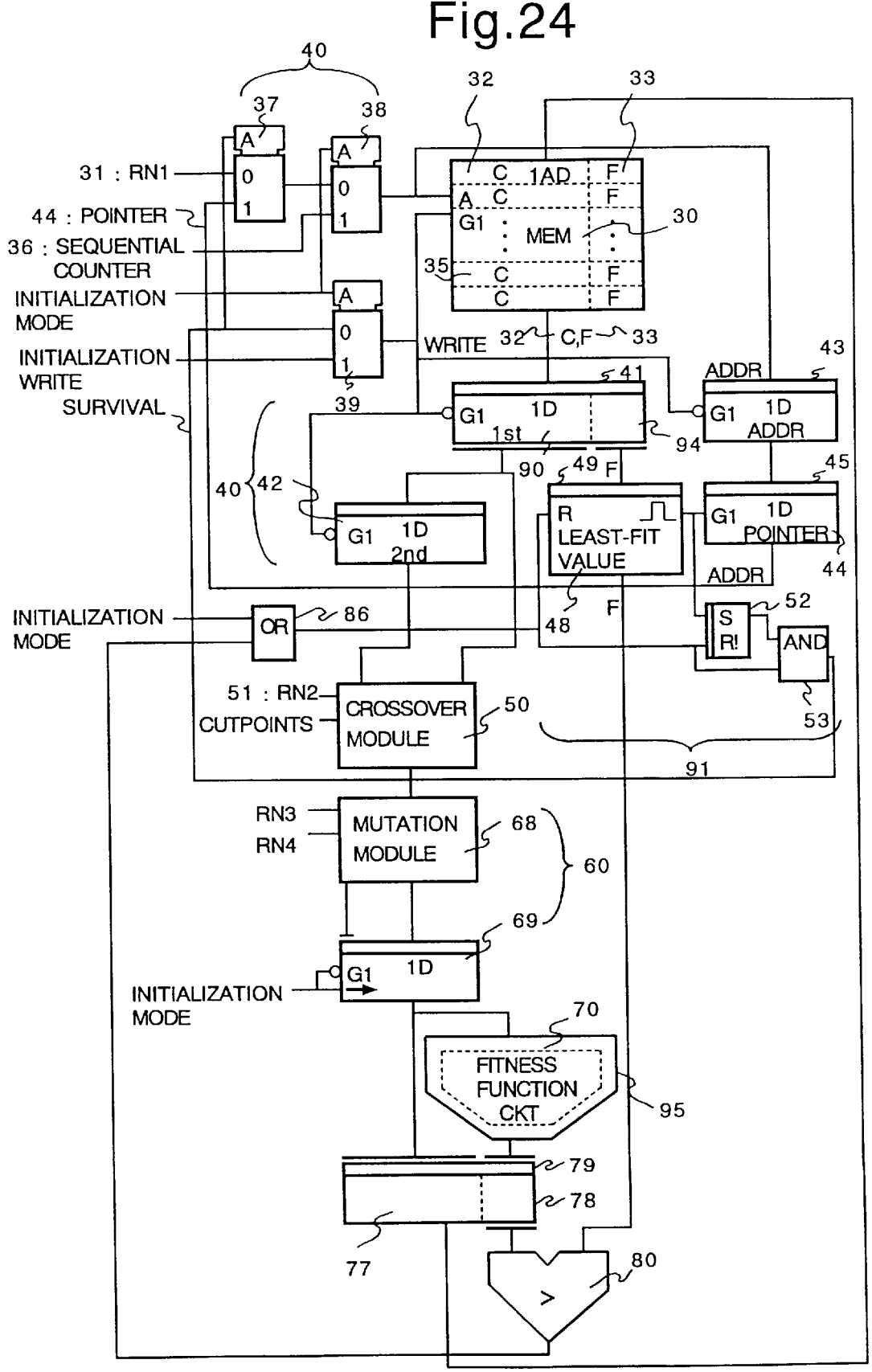
FIG. 24 shows an overall view of an alternative GA machine to the GA machine of FIG. 17 illustrating an alternative initialization circuit to the initialization circuit of FIG. 17 or 23.
Figure 25:
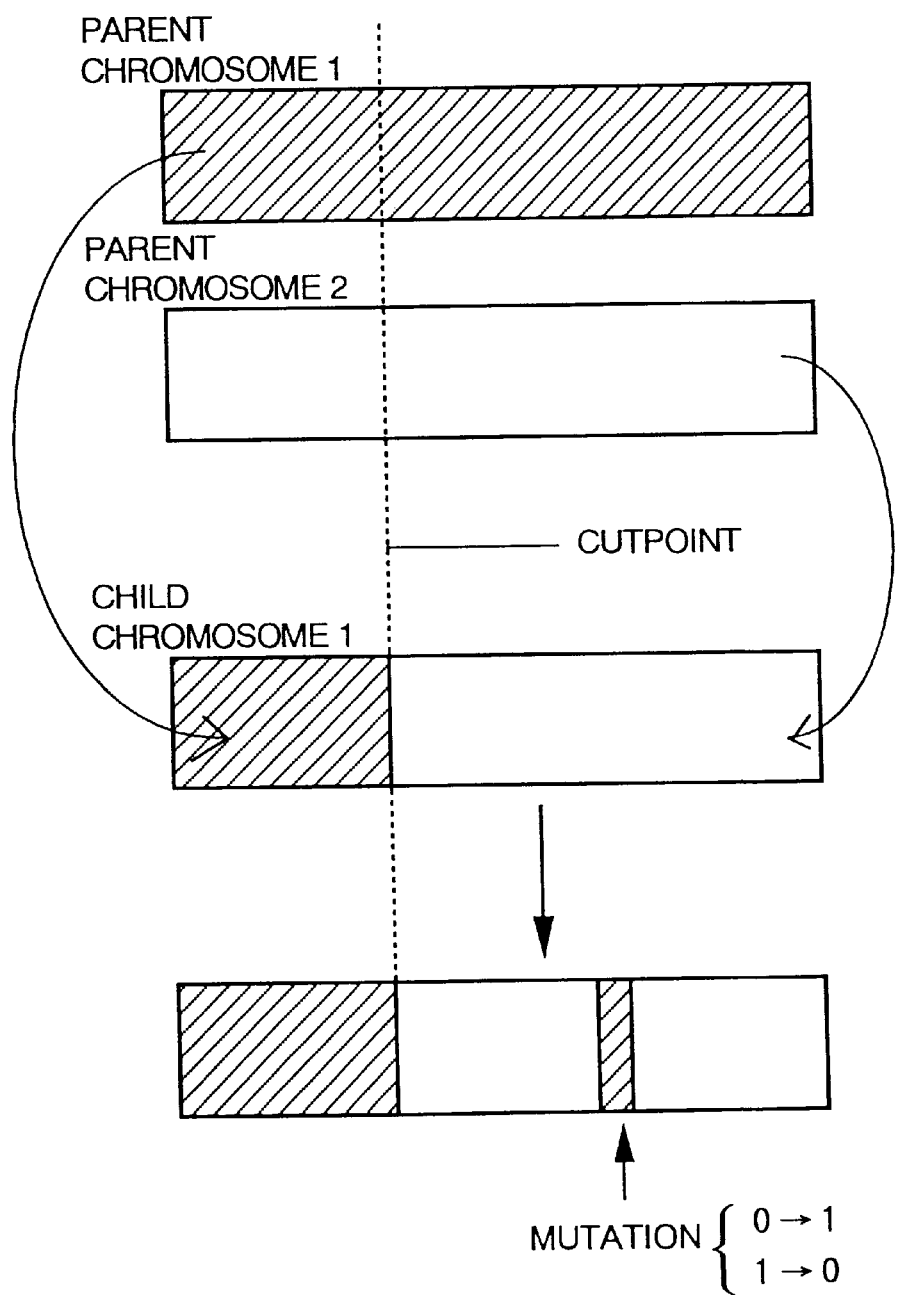
FIG. 25 shows a conventional GA.

FIG. 24 shows an overall view of a GA machine with the replacement of the initialization circuit of FIG. 23 for the initialization circuit of FIG. 13 in the GA machine of FIG. 17.

With the alternative initialization circuit the mutated chromosome register 69 receives the random serial pattern from the absolute value comparator 66 of the mutation module 68 instead of the private absolute value comparator 98 for the random chromosome generation. Thus the absolute value comparator 66 can be shared by the mutation module 68 and the mutated chromosome register 69. The density of 1s in the random pattern can be controlled by the externally supplied PDF parameter. To achieve this alternative approach, the externally supplied PDF parameter is set to an initialization value in the initialization mode.

An alternative GA machine framework to those described hereinbefore is now discussed.

The composing elements of the GA machine or framework of this invention, i.e., population memory, selector, crossover module, mutation operator, survival comparator, fitness function circuit, described singly hereinbefore are all physically associated one another within the machine and do not exist independently from others. The present invention is characterized by the hardware implementation of the functions of those elements in that hardware-based elements are designed to implement a GA so that the physical composition or packaging of a GA machine is least significant here.

In contrast to the non-problem-specific aspect of the GA framework including general-purpose elements of population memory, selector, crossover module, mutation operator, and survival comparator which are all applicable to any problems, one or more of these elements may be designed problem-specific. Otherwise in an alternate form, all of those elements may be problem-specific like the fitness function circuit 70. The hardware implementation of those elements (and the fitness function circuit) of this invention is further characterized by the acceleration of the execution speed of a GA with the hardware-based elements designed to implement the GA. In the conventional art, a GA is executed on general-purpose or reconfigurable computers, whereas the present invention employs the hardware-based elements (including the fitness function circuit) designed to operate in synchronization with a machine cycle in order to accelerate the execution speed of a GA. Thus the GA machine of the present invention accelerates the execution speed of a GA by 100 or 1000 times quicker than that with the conventional GA machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A genetic algorithm (GA) machine for executing a GA using a chromosome representing a potential problem solution, said GA machine comprising:

a population memory for storing a population of chromosomes;

a selector for selecting a chromosome from among the chromosomes in the population as a parent chromosome;

a crossover module for inputting a plurality of parent chromosomes and performing a crossover operation on the plurality of parent chromosomes for creating a new chromosome and outputting the new chromosome as a child chromosome;

a mutation operator for inputting the child chromosome and mutating the child chromosome and generating a mutated chromosome;

a mount for mounting a fitness function circuit for evaluating a fitness of the mutated chromosome and outputting an evaluated value of the fitness of the mutated chromosome; and a survival comparator for determining a survival of the mutated chromosome based upon the evaluated value.

2. The GA machine of claim 1, wherein said population memory, selector, crossover module, mutation operator, and survival comparator are non-problem-specific general-purpose hardware circuits to form a framework of a multi-purpose non-problem-specific GA machine.

3. The GA machine of claim 2, wherein the multi-purpose non-problem-specific GA machine turns into a problem-specific GA machine when a problem-specific fitness function circuit is mounted on said mount.

4. The GA machine of claim 3, wherein the fitness function circuit is implemented in a reconfigurable hardware circuit.

5. The GA machine of claim 4, wherein the reconfigurable hardware circuit includes a field-programmable gate array (FPGA).

6. The GA machine of claim 3, wherein said population memory, selector, crossover module, mutation operator, survival comparator and the fitness function circuit operate in synchronization with a common machine cycle.

7. The GA machine of claim 3, further comprising an initialization circuit for initializing said population memory by using at least a part of said mutation operator and a part of the evaluator circuit.

8. The GA machine of claim 7, wherein said initialization circuit generates a random bit pattern sequentially based upon an externally supplied parameter, evaluates the fitness of a random bit pattern, and then stores the bit pattern and the evaluated value of the fitness sequentially in said population memory.

9. The GA machine of claim 1, wherein said population memory stores both the parent and child chromosomes in an area of a single memory space.

10. The GA machine of claim 9, wherein said population memory replaces a less-fit chromosome in the population by a more-fit chromosome so that the more-fit chromosome has a longer lifetime in said population memory.

11. The GA machine of claim 10, further comprising:

an address pointer register for storing an address of a least-fit chromosome among parent chromosomes selected from among the chromosomes in said population memory after a replacement of one of the chromosomes of the population;

wherein said population memory replaces a chromosome located at the address stored in said address pointer register by the mutated chromosome.

12. The GA machine of claim 10, wherein said selector selects a chromosome at random without regard to the fitness.

13. The GA machine of claim 12, wherein said selector selects a plurality of chromosomes from among the chromosomes in the population memory as the parent chromosomes.

14. The GA machine of claim 9, wherein said selector includes a plurality of chromosome registers cascaded in series for passing a selected parent chromosome from one chromosome register to another, wherein each of said chromosome register having a storage capacity of one chromosome, wherein each of said chromosome register outputs a received parent chromosome in parallel to another chromosome register concurrently to said crossover module.

15. The GA machine of claim 10, further comprising:

an evaluated chromosome register for storing the evaluated value of the fitness and a corresponding chromosome, and a least-fit value register for storing the evaluated value of the fitness of a least-fit parent chromosome among parent chromosomes selected by said selector, wherein said survival comparator compares the evaluated values of the fitness in said evaluated chromosome register and least-fit value register and transfers the evaluated value of the fitness and the corresponding chromosome evaluated to said population memory for the replacement of the less-fit chromosome in the population based upon a compared result.

16. The GA machine of claim 1, wherein the chromosome includes n bits, wherein said crossover module includes, a template generator for generating a template including a pattern indicating a cutpoint, a template shift register having a storage capacity of n bits, for inputting and then shifting the template and outputting bit values corresponding to the respective n bits in the chromosome, and a multiplex operator for performing the crossover operation on the respective n bits in the chromosome, wherein each of the n bits processed in parallel to another bit, based upon the bit values at corresponding bit positions in the template shift register.

17. The GA machine of claim 16, wherein said multiplex operator includes a plurality of multiplexers, each multiplexer for inputting i-th ($1 \leq i \leq n$) bits of a plurality of n-bit chromosomes, selecting one of the i-th bits based upon a bit value at an i-th bit position in said template shift register and outputting a selected i-th bit as an i-th bit of the child chromosome.

18. The GA machine of claim 17, wherein said crossover module requires $\log_2 q$ (decimals raised to the next whole number) number of template shift registers when performing the crossover operation on q ($q \geq 2$) number of the parent chromosomes, wherein said multiplexer inputs the i-th bits of the $\log_2 q$ (decimals raised to the next whole number) number of said template shift registers, and selects one of the i-th bits of the $q(q \geq 2)$ number of the parent chromosomes.

19. The GA machine of claim 16, wherein said template generator self-regulates probabilistically a cutpoint-indicating pattern generation based upon an externally supplied number of cutpoints.

20. The multi-purpose non-problem-specific GA machine of claim 19, wherein said template generator includes, a counter for counting a number of patterns indicating a cutpoint in said template shift register and outputting a counted number, a cutpoint-number comparator for comparing the counted number with the externally supplied number of cutpoints and outputting a cutpoint-number compared result, a threshold-value counter for setting a threshold value for generating the pattern indicating a cutpoint based upon the cutpoint-number compared result, a threshold-value comparator for comparing the threshold value with a random number and outputting a threshold-value compared result, and a toggle flip-flop for generating the cutpoint-indicating pattern based upon the threshold-value compared result.

21. The GA machine of claim 20, wherein said template generator includes a pattern generator for generating the pattern indicating a cutpoint based upon the counted number of the patterns indicating a cutpoint.

22. The GA machine of claim 1, wherein the chromosome includes n bits, wherein said mutation operator includes,
a mutation module for mutating each bit in an n-bit chromosome singly in parallel to another bit and outputting the mutated chromosome, and
a mutated chromosome register for loading each bit in the mutated chromosome in parallel to another bit.

23. The GA machine of claim 22, wherein said mutation operator further includes, first and second random pulse stream generators for generating first and second pulse streams, respectively, each stream having a predetermined pulse density p based upon a random number,
an AND gate for ANDing the first and second pulse streams and generating a third pulse stream having a pulse density $p^2$, and
an XOR gate for XORing each bit of the third pulse stream with a corresponding bit in a n-bit chromosome.

24. The GA machine of claim 1, wherein said mount comprises a device for removably mounting a different fitness function circuit depending upon a problem to be solved.

25. The GA machine of claim 1, wherein said survival comparator compares the evaluated value with a fitness value of a least-fit parent chromosome in said population memory, and replaces a chromosome in the population memory corresponding to the least-fit parent chromosome with the mutated chromosome.

26. The GA machine of claim 1, wherein said selector selects the chromosome from among the chromosomes in the population as a parent chromosome based on a random selection, without regard to the evaluated value.

27. A method for manufacturing a genetic algorithm (GA) machine for executing a GA using a chromosome representing a potential problem solution, said method comprising the step of producing hardware-based population memory, selector, crossover module, mutation operator, and survival comparator which are designed to implement a GA.

28. A method for producing a genetic algorithm (GA) machine for executing a GA using a chromosome representing a potential problem solution, said method comprising the steps of:

producing at least one of population memory, selector, crossover module, mutation operator, and survival comparator formed as a multi-purpose non-problem-specific framework, and producing a fitness function circuit for evaluating a problem-specific fitness of the chromosome, and mounting the fitness function circuit on the multi-purpose non-problem-specific framework so that the GA machine turns problem-specific.

29. A method for executing a genetic algorithm (GA) using a chromosome representing a potential problem solution in a GA machine provided with a population memory for storing a population of chromosomes along with corresponding values of a fitness, said method comprising the step of replacing a less-fit chromosome among the chromosomes stored in the population with a more-fit child chromosome created through an execution of the GA so that a more-fit chromosome has a longer lifetime in the population memory.

30. The method for executing a GA of claim 29, further comprising the steps of:

storing an address in the population memory of a least-fit chromosome among chromosomes selected after a replacement of the less-fit chromosome in the population, and
replacing a chromosome at the address in the population memory with a child chromosome.

31. The method for executing a GA of claim 29, further comprising the step of selecting a chromosome from among chromosomes in the population at random without regard to the fitness and outputting a parent chromosome.

32. A method for executing a genetic algorithm (GA) in a GA machine provided with a crossover module for creating a child chromosome through a crossover operation on a chromosome, said method comprising the step of probabilistically controlling a number of cutpoints on a chromosome used in the crossover operation based upon an externally supplied number of cutpoints.

33. The method for executing a GA of claim 32 further comprising the step of generating a cutpoint based upon a cutpoint number probabilistically generated in said probabilistically controlling step to guarantee that there is always at least one cutpoint.

34. A method for executing a genetic algorithm (GA) using a simulated chromosomal data representing a potential problem solution in a GA machine provided with a population memory for storing a population of chromosomes and corresponding values of a fitness and a fitness function circuit for evaluating the fitness of a chromosome, said method comprising the step of initializing the population memory, wherein said initializing step including,
generating a random bit pattern sequentially based upon an externally supplied parameter,
evaluating the fitness of the random bit pattern and outputting an evaluated value, and
storing the evaluated value and the random bit pattern to the population memory.

* * * * *